US009796212B2

(12) United States Patent
Nakamura

(10) Patent No.: US 9,796,212 B2
(45) Date of Patent: Oct. 24, 2017

(54) HUB UNIT BEARING

(71) Applicant: NSK Ltd., Shinagawa-ku, Tokyo (JP)

(72) Inventor: Yuji Nakamura, Toyota (JP)

(73) Assignee: NSK Ltd., Tokyo (JP)

( * ) Notice: Subject to any disclaimer, the term of this patent is extended or adjusted under 35 U.S.C. 154(b) by 127 days.

(21) Appl. No.: 14/516,145

(22) Filed: Oct. 16, 2014

(65) Prior Publication Data

US 2015/0078691 A1 Mar. 19, 2015

Related U.S. Application Data

(62) Division of application No. 13/392,334, filed as application No. PCT/JP2010/067258 on Oct. 1, 2010, now abandoned.

(30) Foreign Application Priority Data

Oct. 6, 2009 (JP) ................................. 2009-232099
Mar. 24, 2010 (JP) ................................. 2010-068333
May 6, 2010 (JP) ................................. 2010-106291

(51) Int. Cl.
*B60B 27/00* (2006.01)
*F16C 33/72* (2006.01)
(Continued)

(52) U.S. Cl.
CPC ...... *B60B 27/0073* (2013.01); *B60B 27/0005* (2013.01); *B60B 27/0068* (2013.01);
(Continued)

(58) Field of Classification Search
CPC ............... B60B 35/18; B60B 27/0073; B60B 2900/511; B60B 2900/5112;
(Continued)

(56) References Cited

U.S. PATENT DOCUMENTS 2,483,988 A 10/1949 Victor et al.
2,589,631 A 3/1952 Schmitz
(Continued)

FOREIGN PATENT DOCUMENTS

JP 2002-372548 A 12/2002
JP 2005-9525 A 1/2005
(Continued)

OTHER PUBLICATIONS

International Search Report dated Dec. 14, 2010 including English-language translation (Four (4) pages).
(Continued)

*Primary Examiner* — Richard W Ridley
*Assistant Examiner* — Brian McGovern
(74) *Attorney, Agent, or Firm* — Crowell & Moring LLP

(57) ABSTRACT

Provided is a hub unit bearing wherein a cover can be firmly fitted with an outer ring member, and it is difficult for foreign matter to enter inside through a water drainage hole formed in the cover. The cover that covers the inside end section in the axial direction of the hub unit bearing includes a disk section, a small-diameter cylindrical section bent in the axial direction from the outer perimeter edge section of the disk section and a large-diameter cylindrical section. A cut and raised section that is cut and raised toward the inside in the radial direction is formed in the small-diameter cylindrical section, and a water drainage hole that passes through from inside to outside the cover is provided in the portion that is cut and separated from the small-diameter cylindrical section.

2 Claims, 28 Drawing Sheets

(51) Int. Cl.
*F16C 33/78* (2006.01)
*F16C 41/00* (2006.01)
*G01P 3/487* (2006.01)
*G01P 3/44* (2006.01)
*F16C 33/80* (2006.01)
*F16C 19/08* (2006.01)
*F16C 33/76* (2006.01)
*F16C 35/04* (2006.01)
*F16C 19/18* (2006.01)

(52) U.S. Cl.
CPC ............ *F16C 19/08* (2013.01); *F16C 33/723* (2013.01); *F16C 33/76* (2013.01); *F16C 33/7896* (2013.01); *F16C 33/805* (2013.01); *F16C 35/042* (2013.01); *F16C 41/007* (2013.01); *G01P 3/443* (2013.01); *G01P 3/487* (2013.01); *B60B 2380/12* (2013.01); *B60B 2380/32* (2013.01); *B60B 2380/73* (2013.01); *B60B 2380/75* (2013.01); *B60B 2380/90* (2013.01); *B60B 2900/211* (2013.01); *B60B 2900/321* (2013.01); *B60B 2900/5112* (2013.01); *B60B 2900/5114* (2013.01); *B60Y 2200/11* (2013.01); *F16C 19/186* (2013.01); *F16C 2326/02* (2013.01)

(58) Field of Classification Search
CPC .......... B60B 2900/5114; B60B 29/561; B60B 29/211; B60B 2380/90; F16C 2326/02; F16C 33/726; F16C 33/723; F16C 33/76; F16C 33/805; F16C 33/7896; F16C 19/18; F16C 19/185; F16C 19/186; F16C 19/187; F16C 35/042
See application file for complete search history.

(56) References Cited

U.S. PATENT DOCUMENTS

| | | |
|---|---|---|
| 5,451,869 A | 9/1995 | Alff |
| 6,705,763 B2 | 3/2004 | Kamura et al. |
| 7,959,158 B2 | 6/2011 | Sanada |
| 7,959,358 B2 | 6/2011 | Nakamura et al. |
| 8,043,010 B2 | 10/2011 | Kawamura et al. |
| 2004/0217551 A1* | 11/2004 | Vignotto ................ B60B 27/00 277/549 |
| 2009/0096441 A1 | 4/2009 | Masuda |
| 2009/0123101 A1 | 5/2009 | Masuda |
| 2010/0209031 A1* | 8/2010 | Kaneko ................. B60B 27/00 384/448 |

FOREIGN PATENT DOCUMENTS

| | | |
|---|---|---|
| JP | 2005-90638 A | 4/2005 |
| JP | 2005-140320 A | 6/2005 |
| JP | 2005-321375 A | 11/2005 |
| JP | 2005-331429 A | 12/2005 |
| JP | 2008-175382 A | 7/2008 |
| JP | 2008-180617 A | 8/2008 |
| JP | 2009-92563 A | 4/2009 |
| JP | 2009-108876 A | 5/2009 |
| JP | 2009-115257 A | 5/2009 |

OTHER PUBLICATIONS

Japanese Office Action dated Oct. 22, 2013 (two (2) pages).
Translation of JP 2005-009525, obtained Jun. 6, 2014.
Translation of JP 2009-108876, obtained Jun. 6, 2014.

* cited by examiner

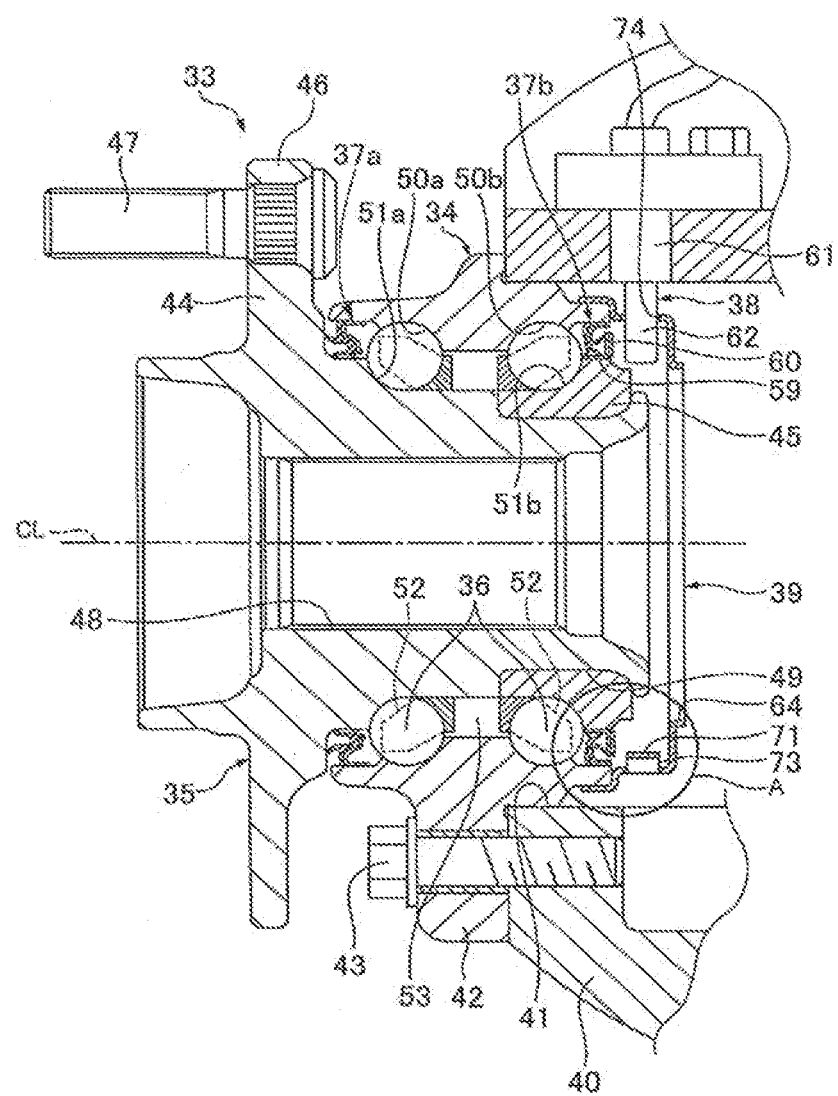
[Fig.1]

[Fig.2]
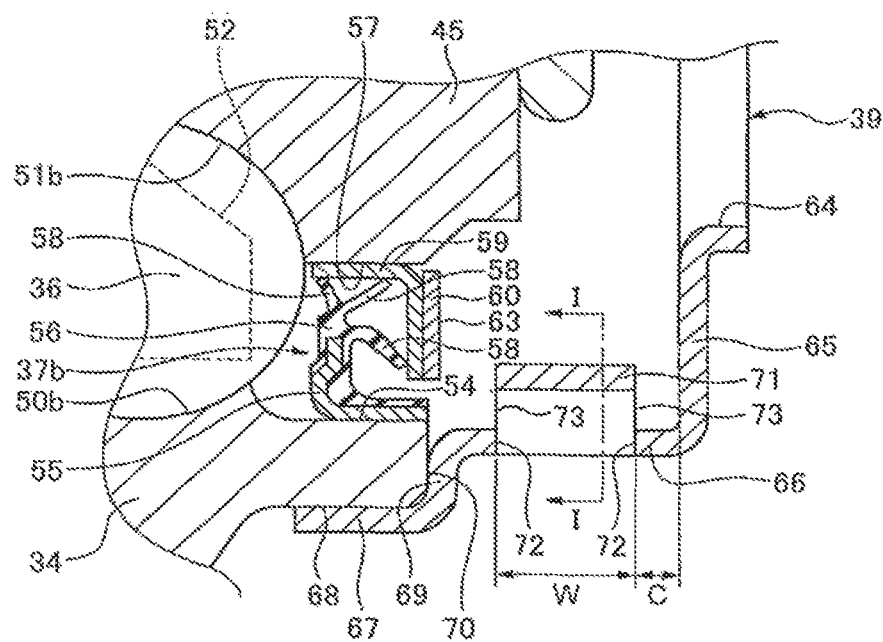
[Fig.3]
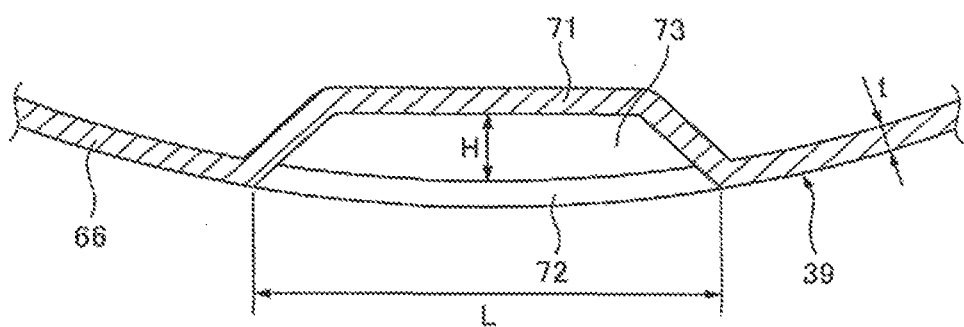

[Fig.4]
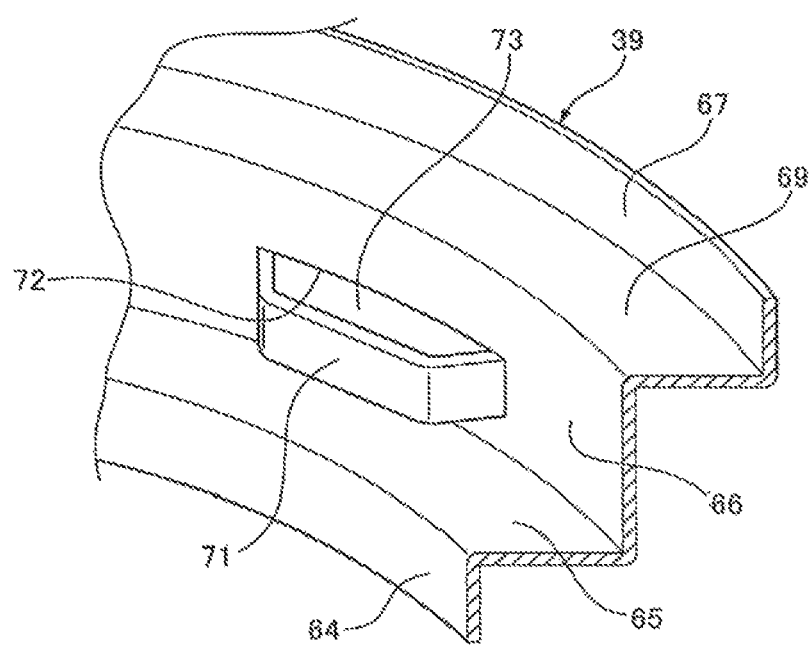

[Fig.5]
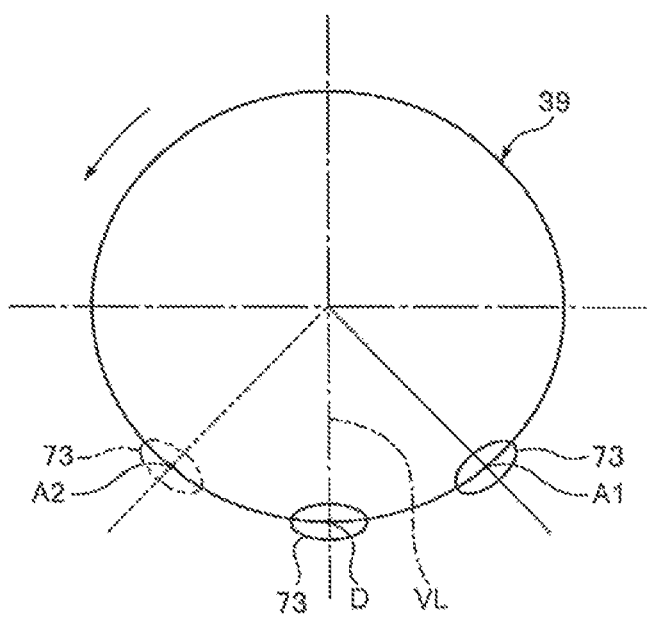

[Fig.6]
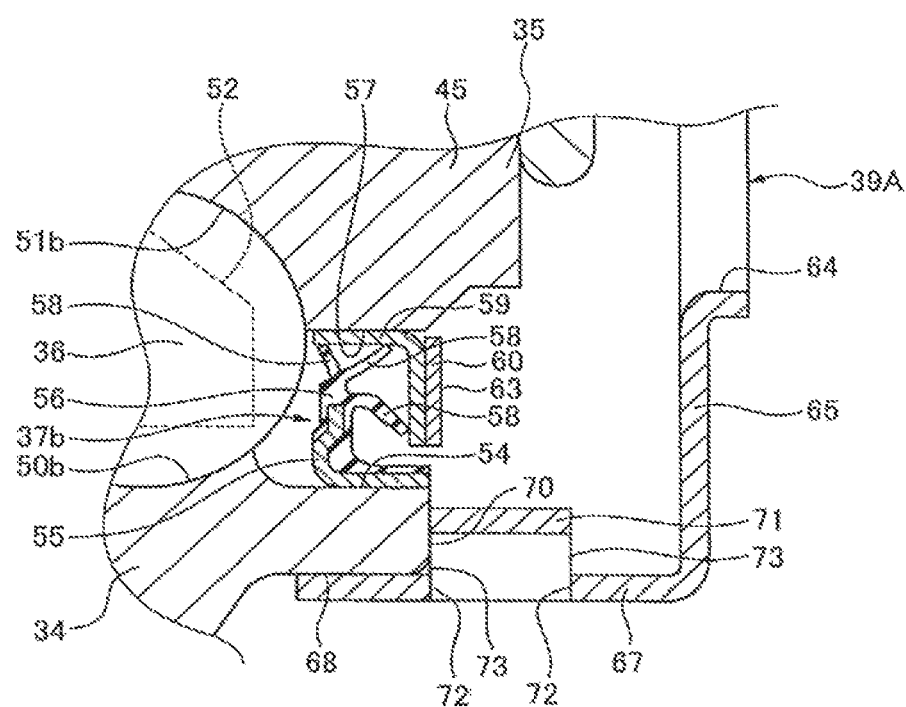

[Fig.7]
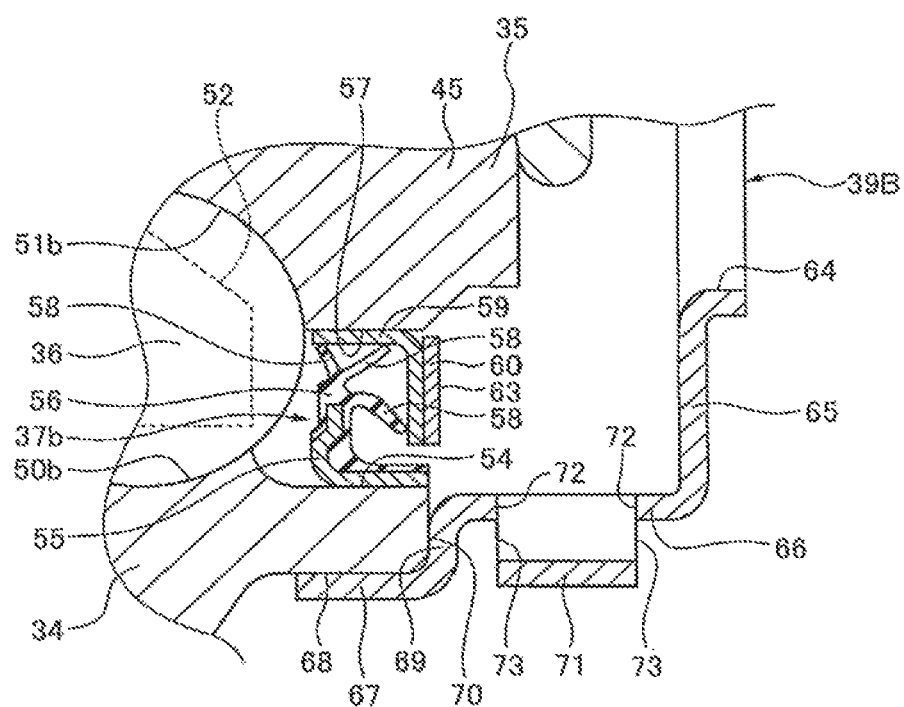

[Fig.8]
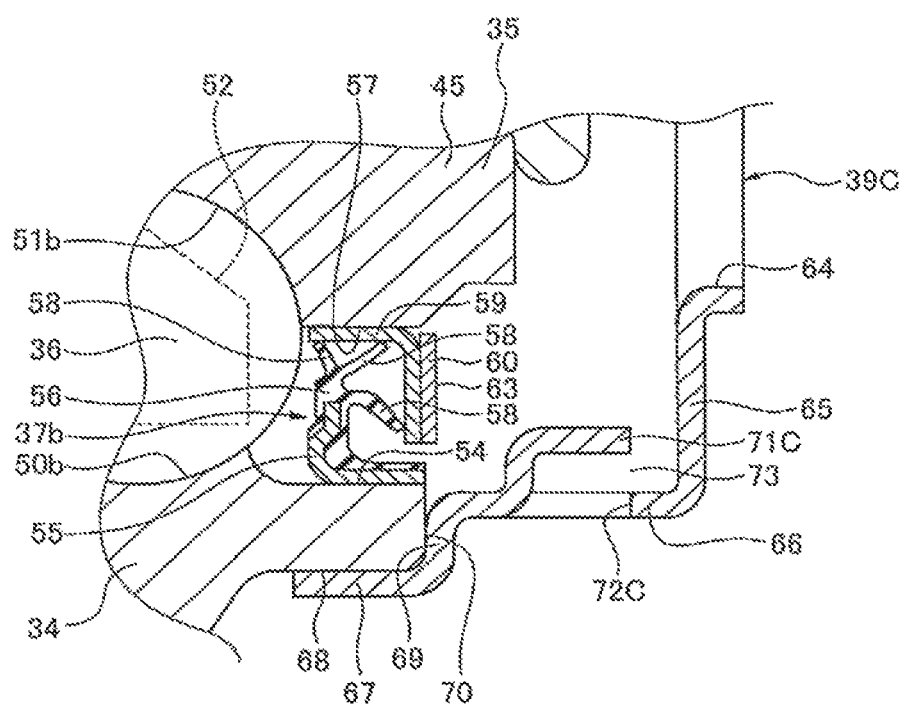

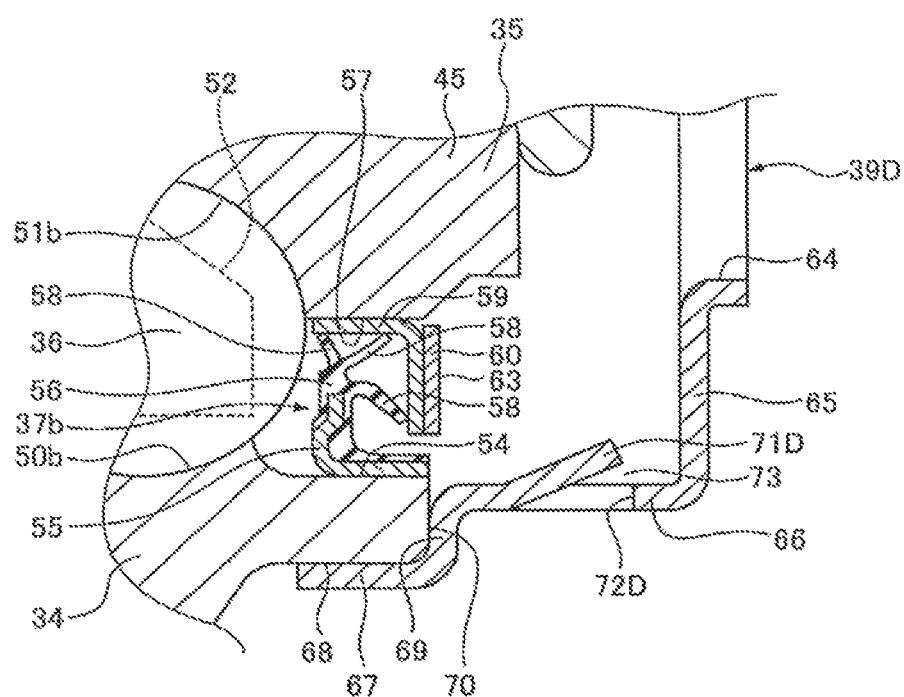
[Fig.9]

[Fig.10]
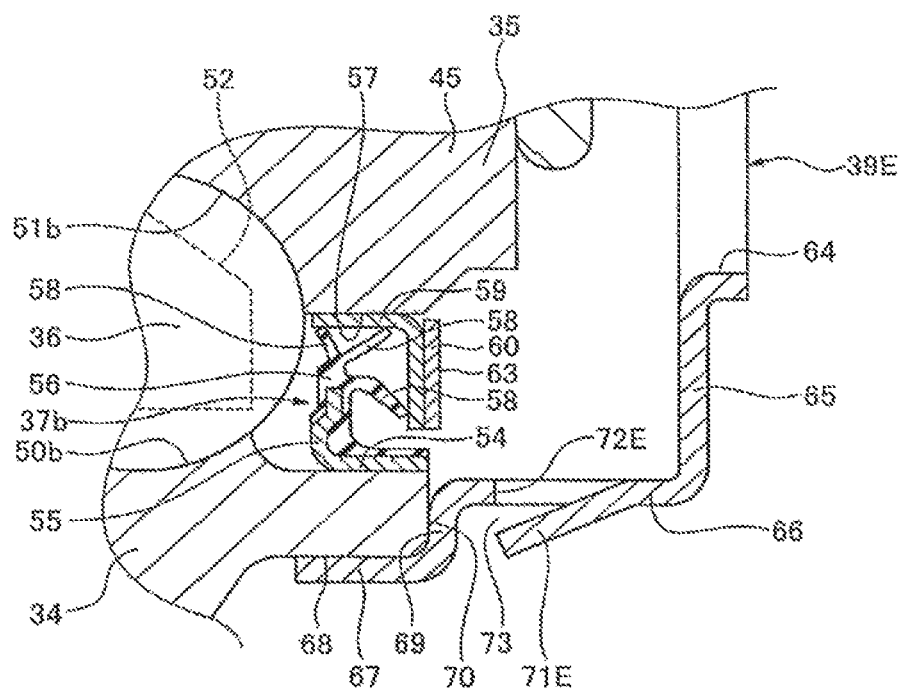

[Fig.11]
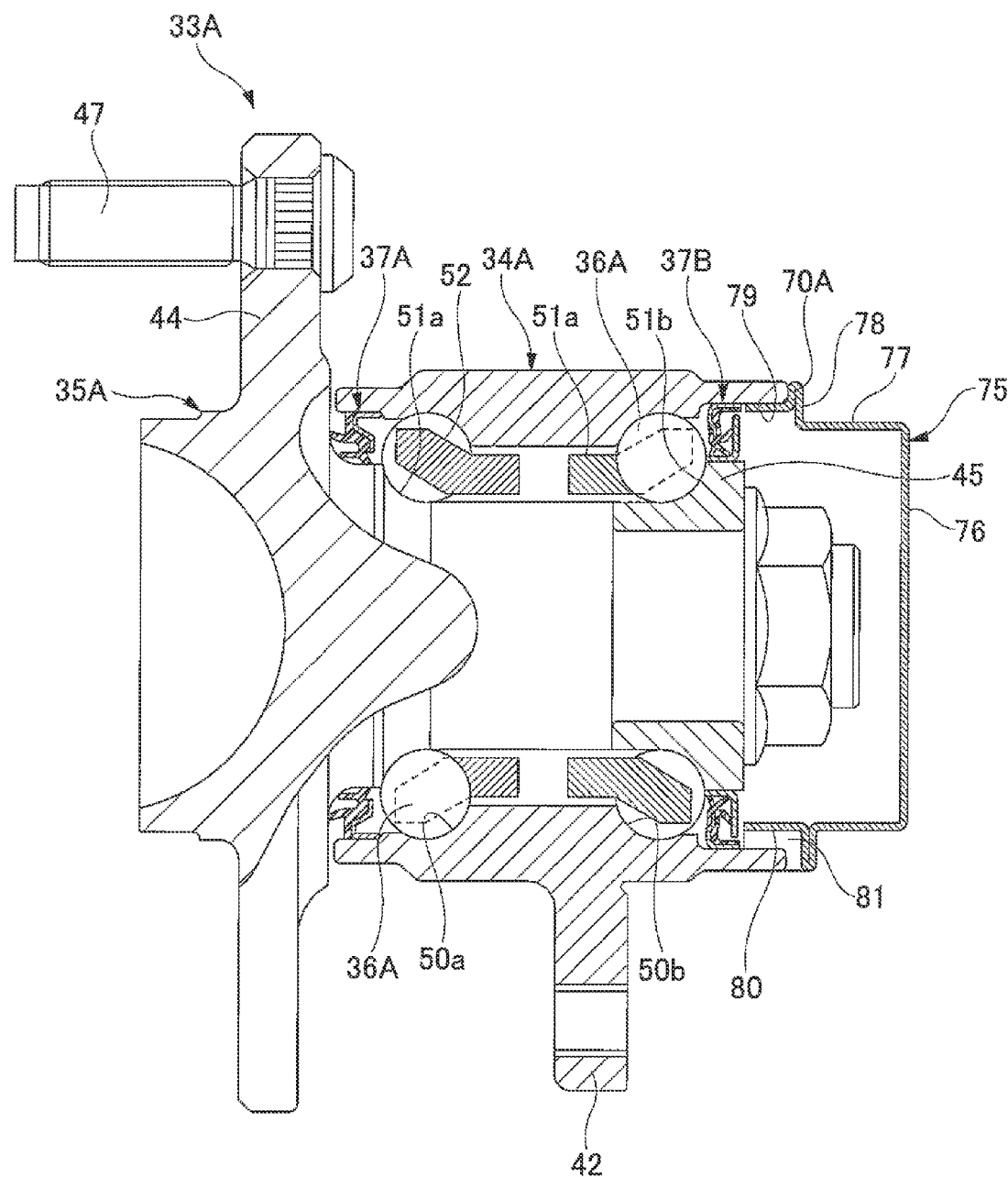

[Fig. 13]
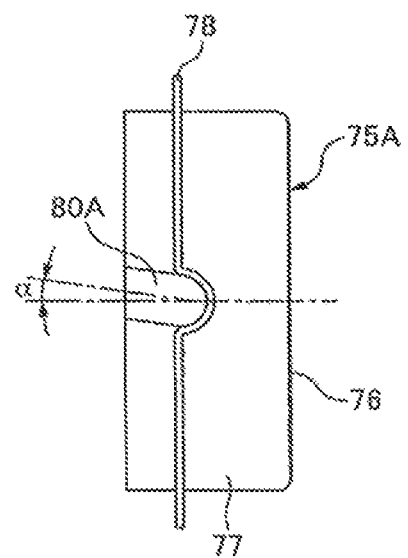

[Fig.14]
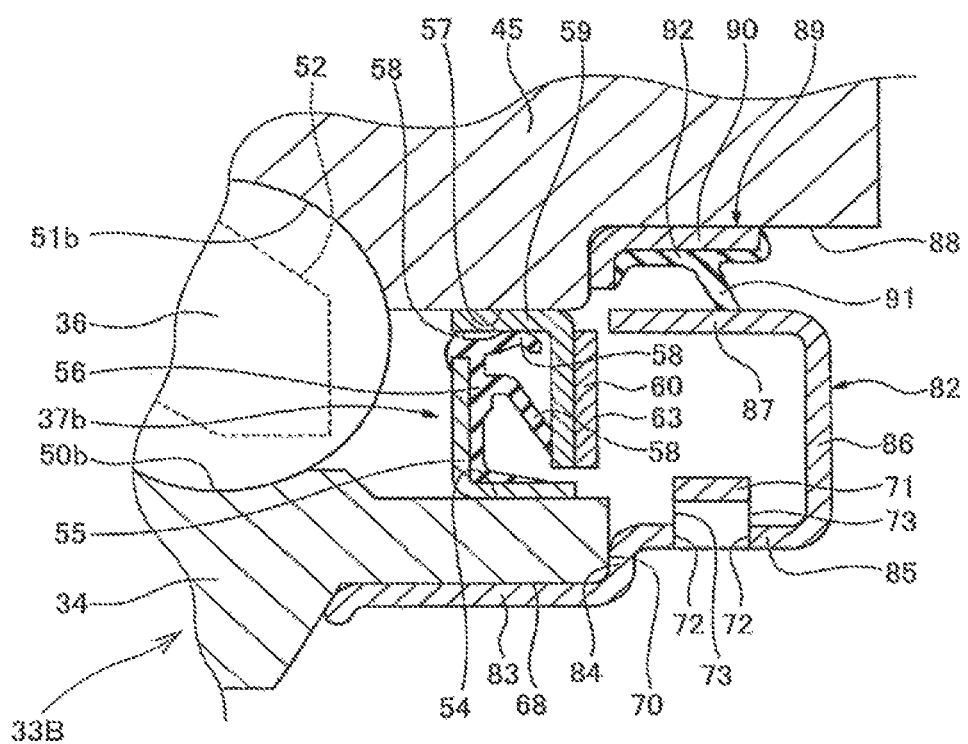

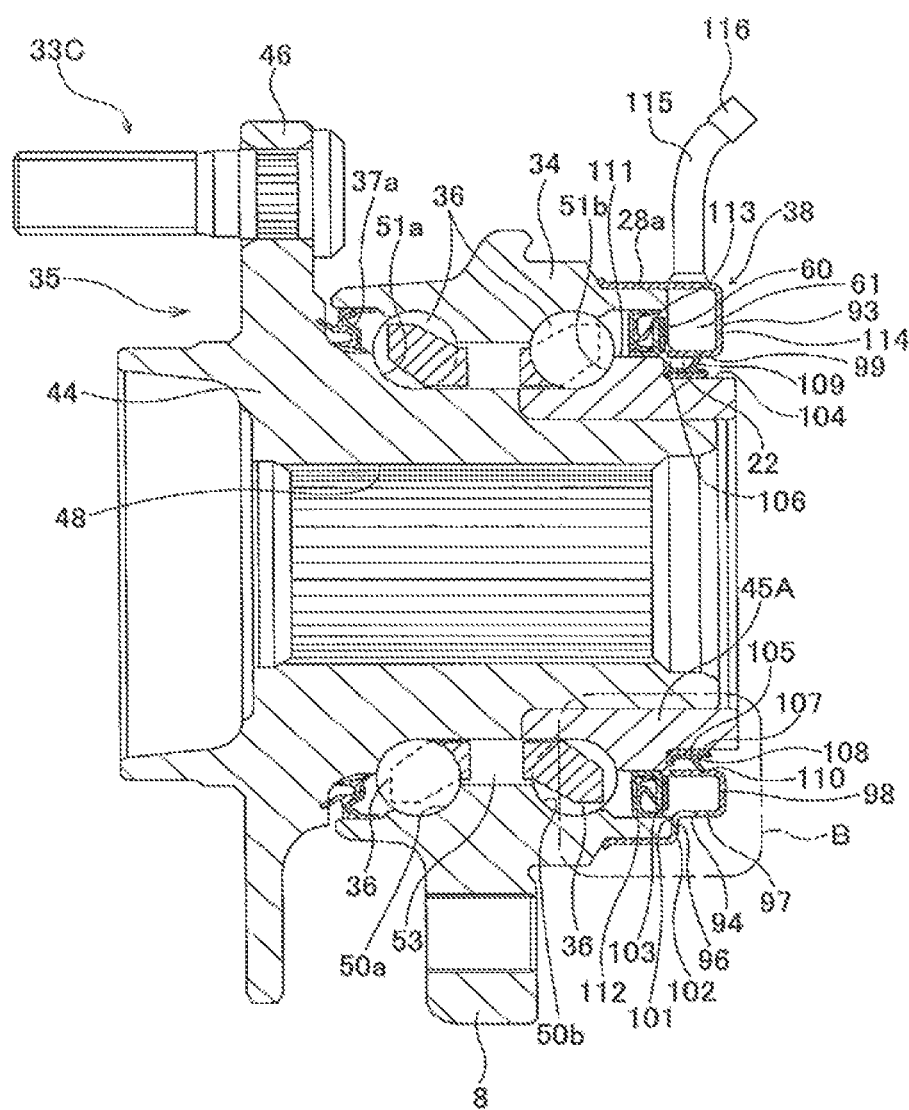
[Fig.15]

[Fig. 16]
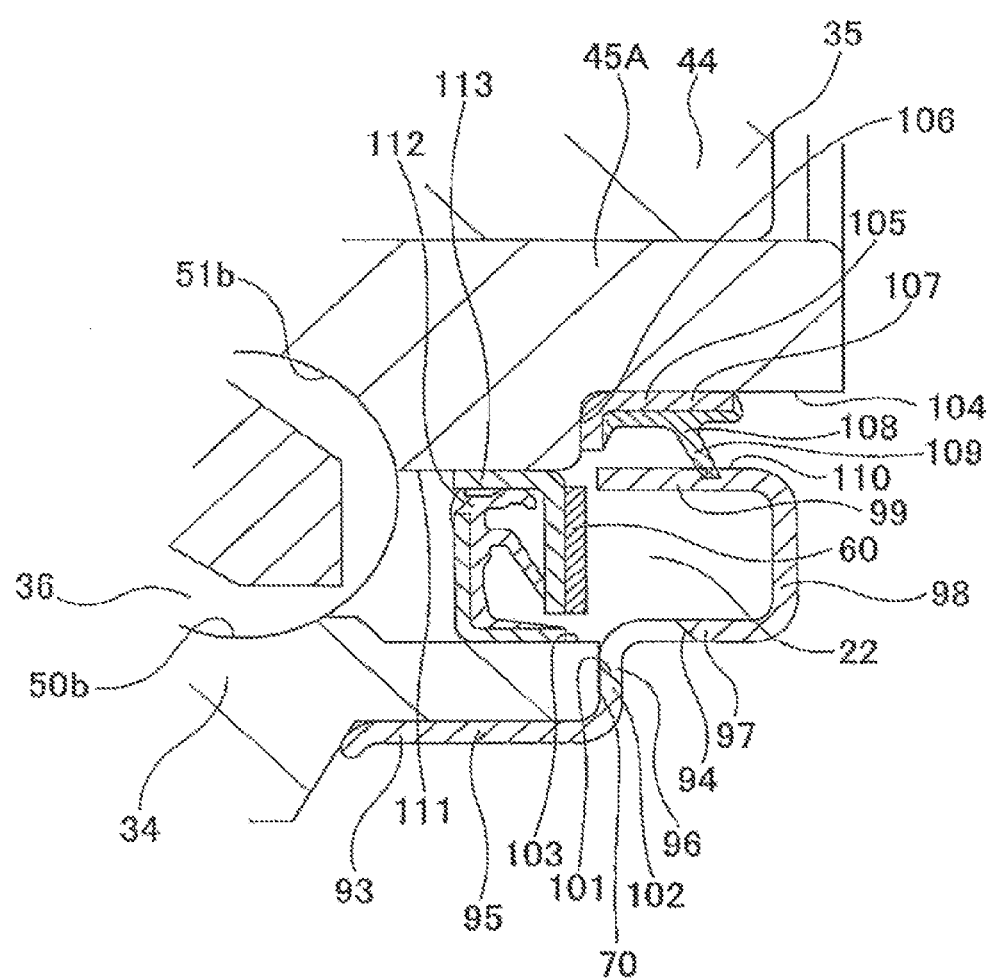

[Fig.17]
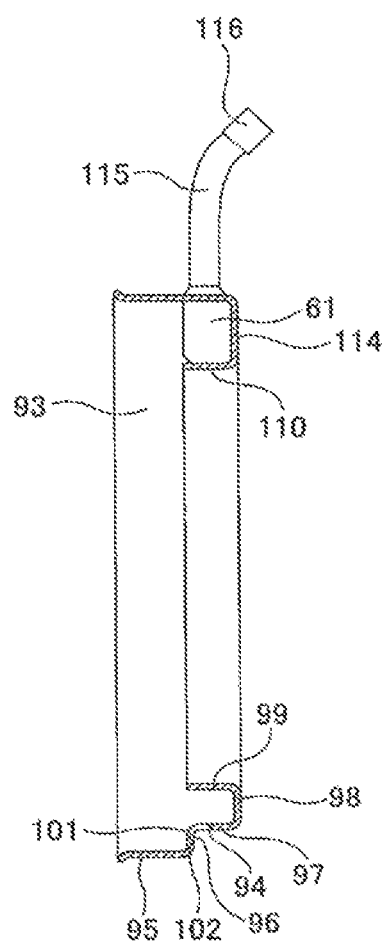

[Fig.18]
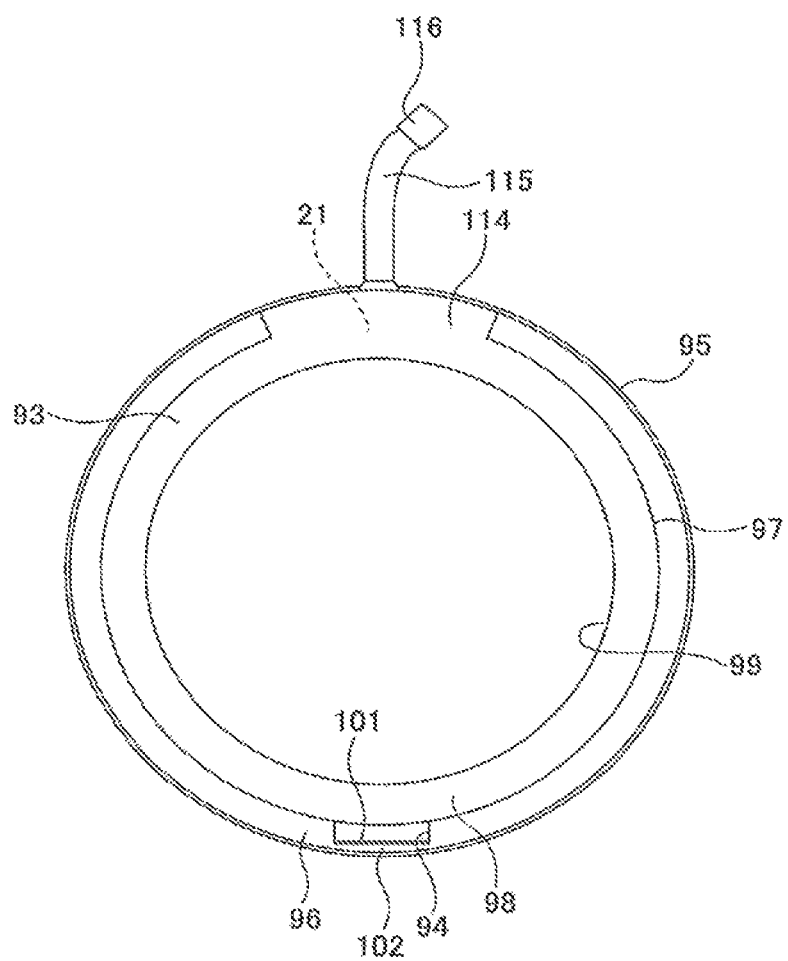

[Fig.19]
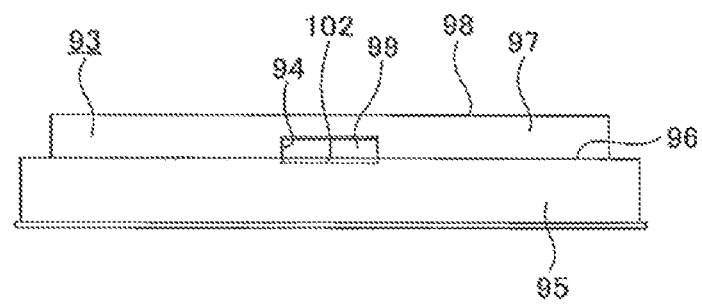
[Fig.20]
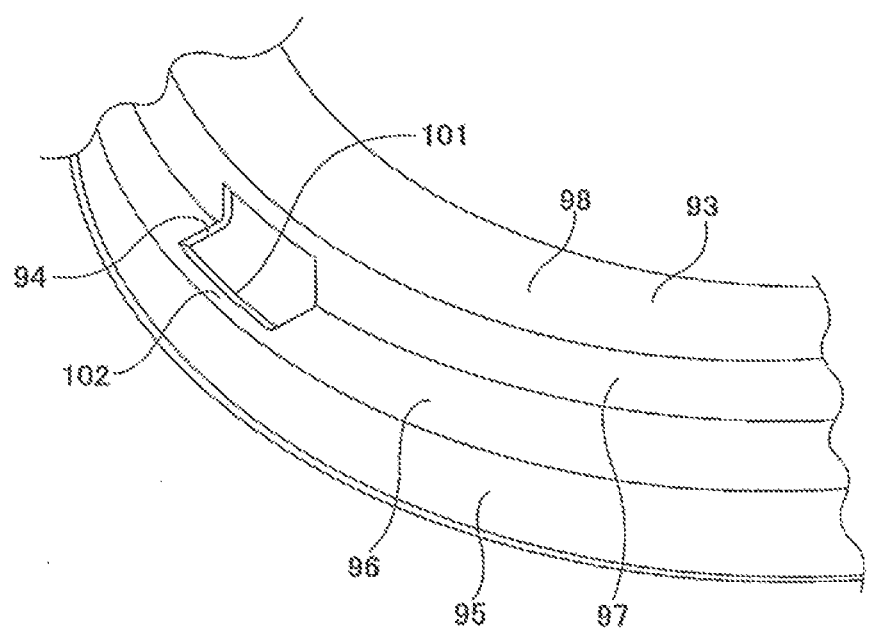

[Fig. 21]
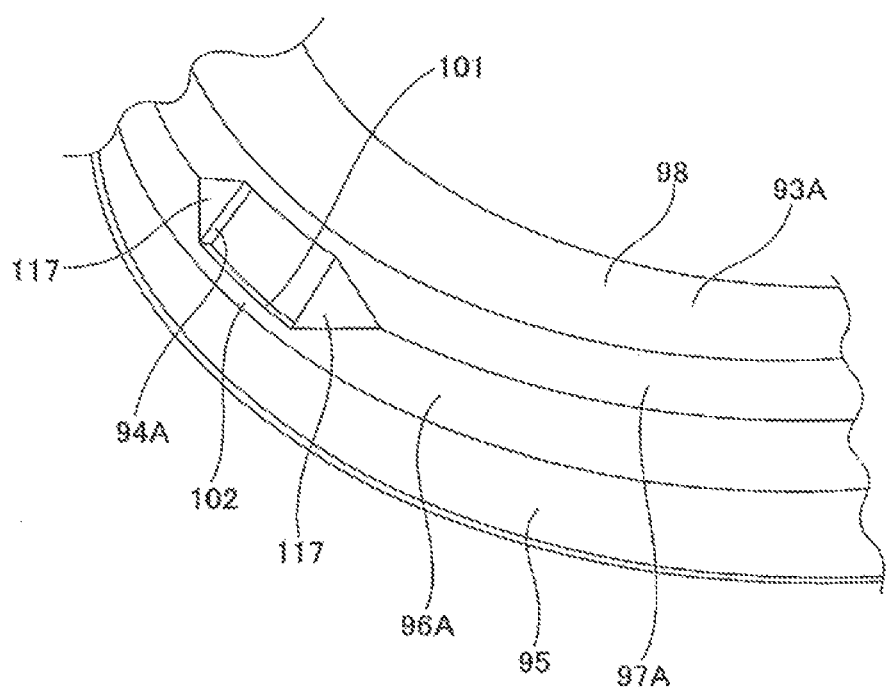

[Fig.22]
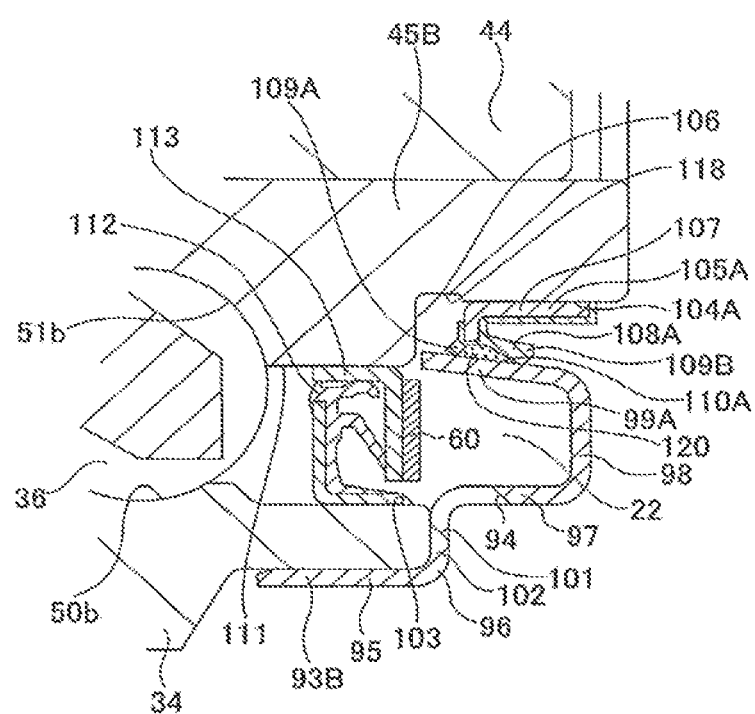

[Fig.23]
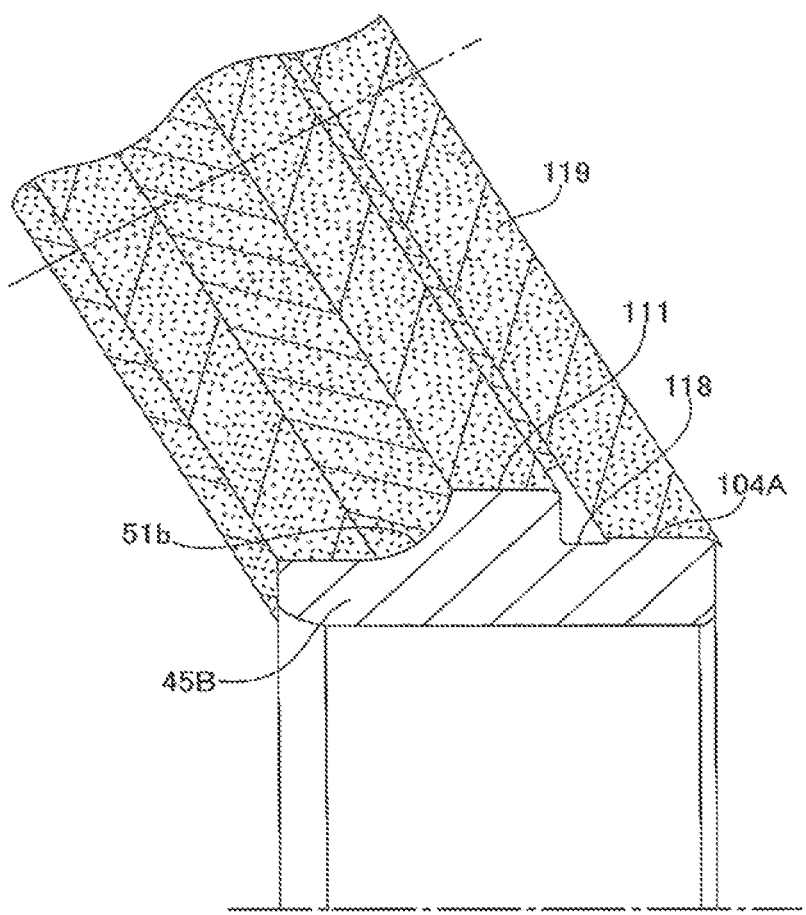

[Fig.24]
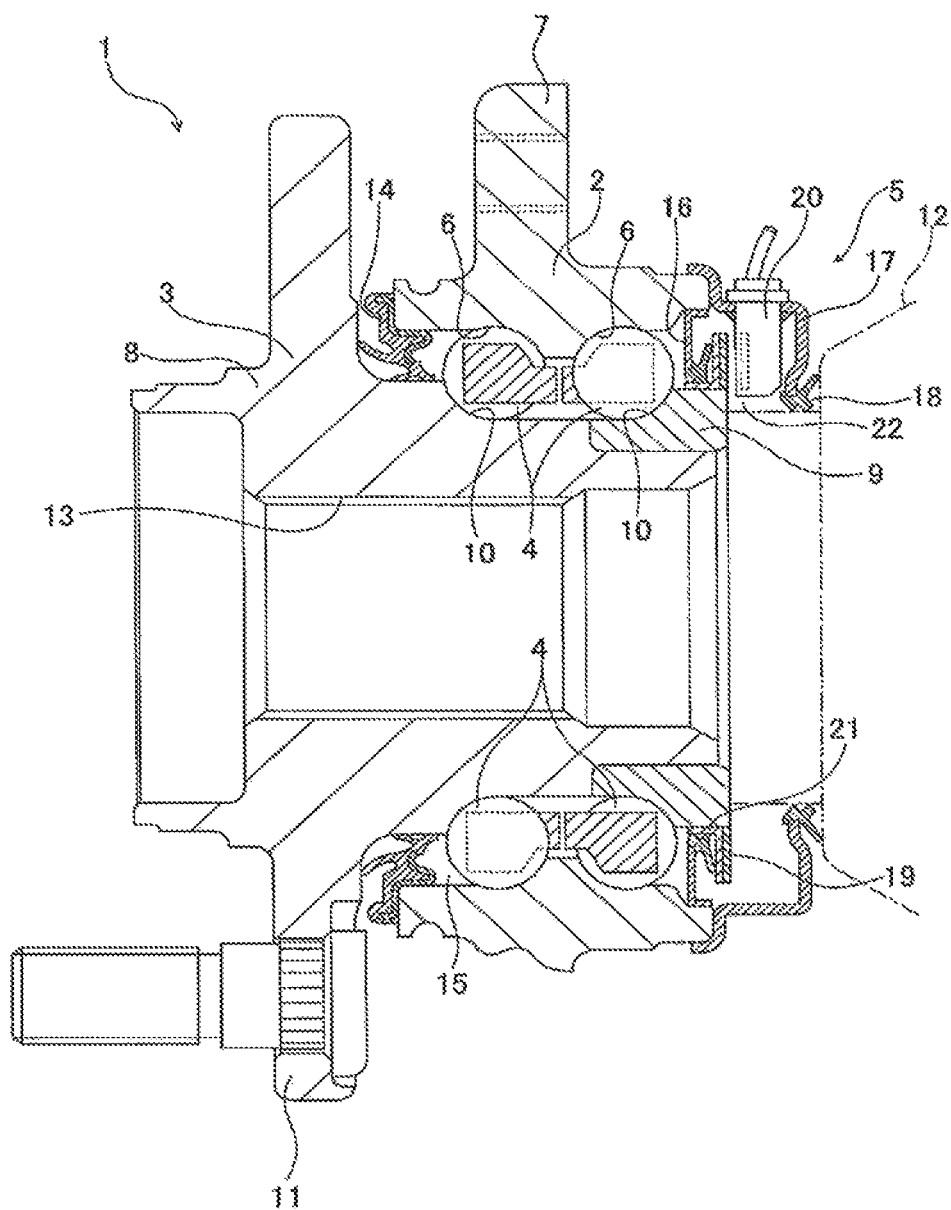
PRIOR ART

[Fig.25]
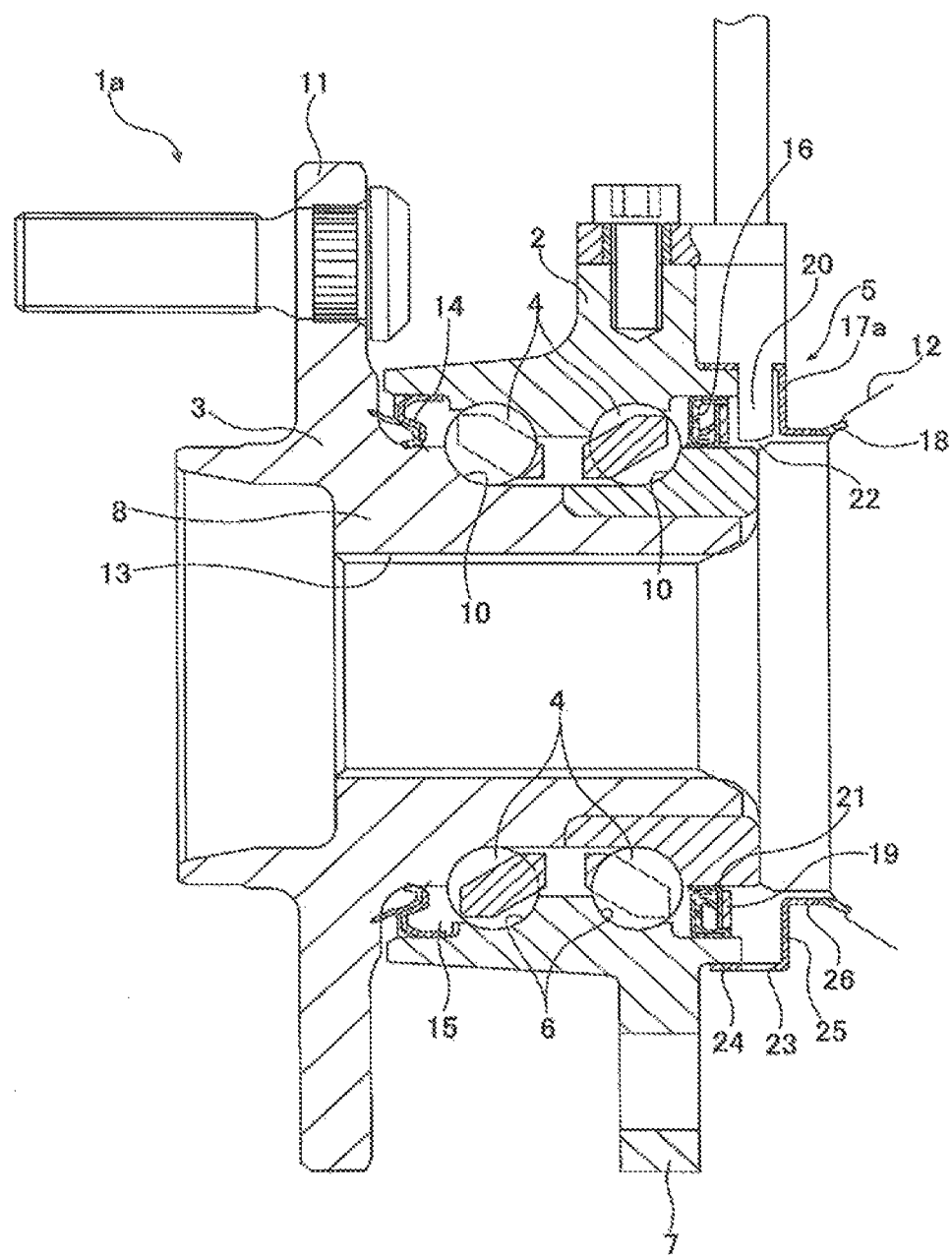
PRIOR ART

[Fig.26]
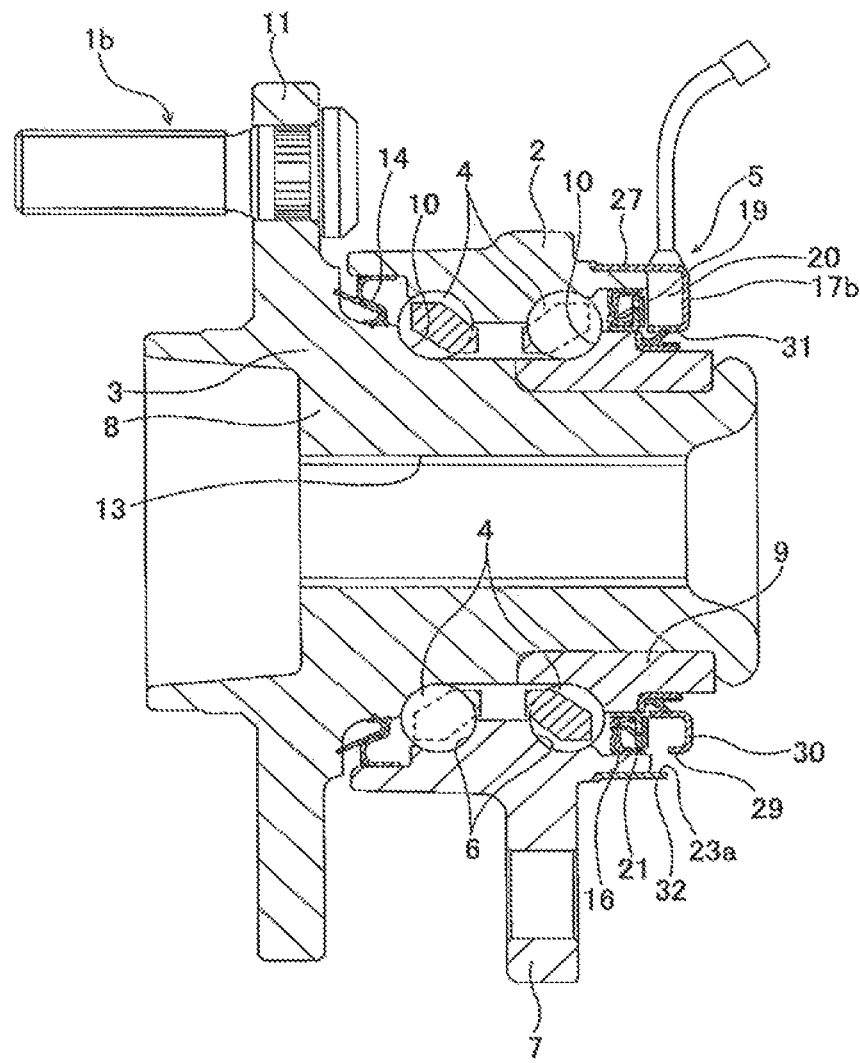
PRIOR ART

[Fig.27]
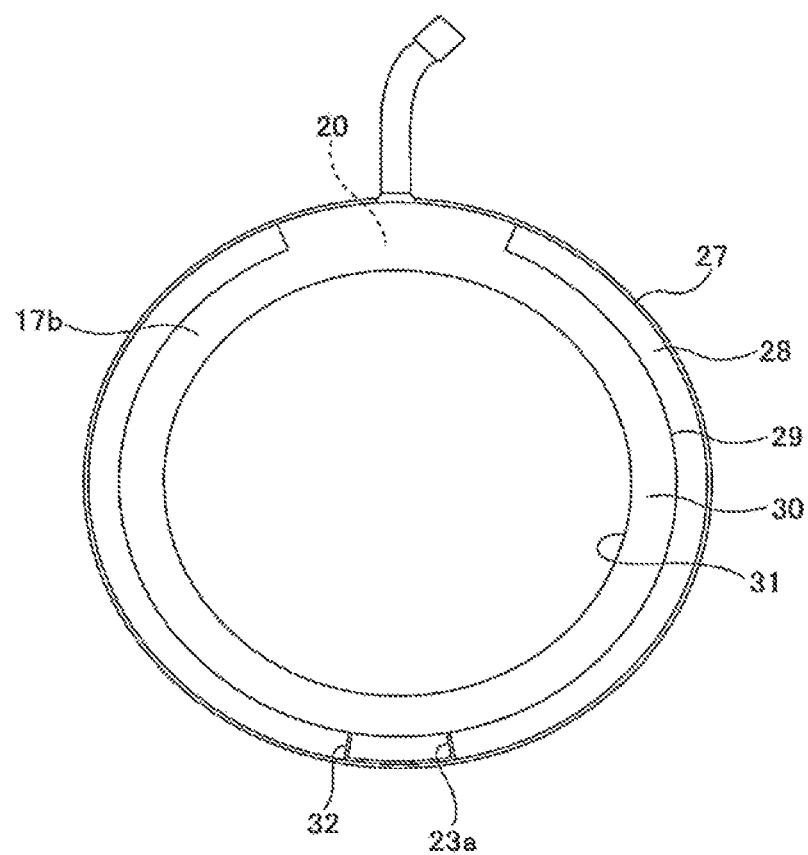
PRIOR ART

PRIOR ART
[Fig.28]
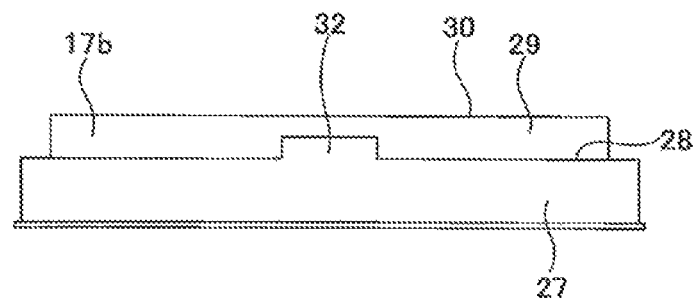
[Fig.29]
PRIOR ART
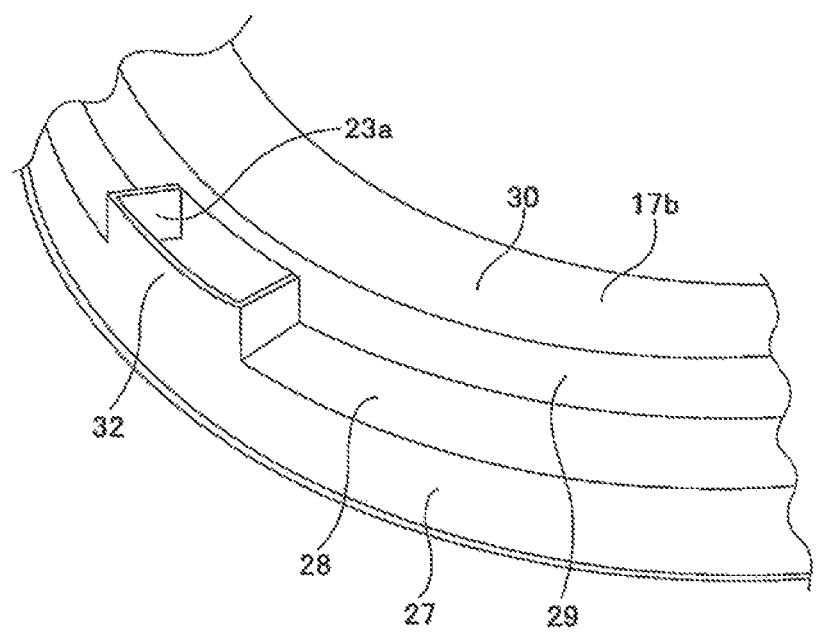

[Fig.30]
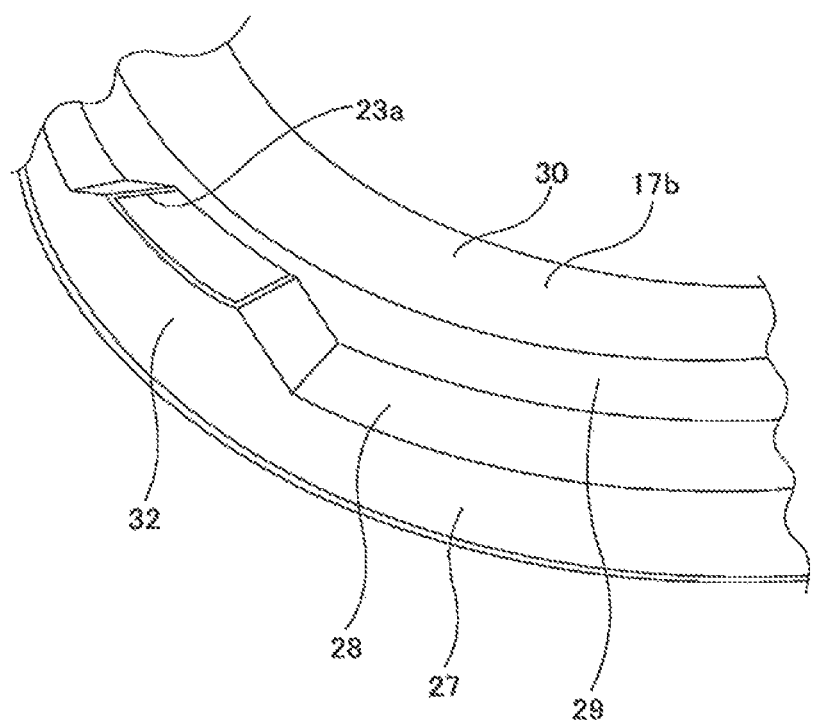
PRIOR ART

[Fig.31]
(A)
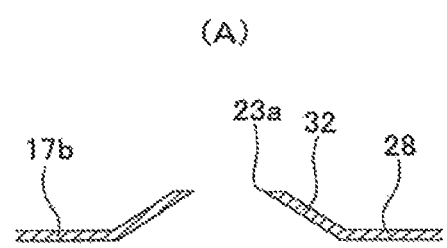
(B)
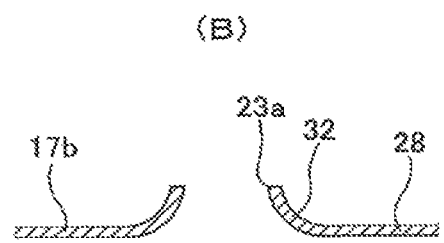
PRIOR ART

HUB UNIT BEARING

CROSS REFERENCE TO RELATED APPLICATION

This application is divisional of U.S. application Ser. No. 13/392,334 filed Feb. 24, 2012, which is National Stage Phase of PCT/JP2010/067258, filed on Oct. 1, 2010, which claims priority from Japanese Patent Application Nos. 2010-106291, filed May 6, 2010, 2010-06833 filed Mar. 24, 2010 and 2009-232099 filed on Oct. 6, 2009, the disclosures of which are expressly incorporated by reference herein.

TECHNICAL FIELD

The present invention relates to a hub unit bearing for supporting the wheels of an automobile so as to be able to rotate freely with respect to the suspension. More specifically, the present invention relates to a hub unit bearing that comprises a cover that, together with covering the inside end section in the axial direction of the outer ring member and inner ring member and preventing foreign matter from entering inside, has a water drain hole for discharging foreign matter that has entered inside to the outside

BACKGROUND ART

Hub unit bearings comprising a rolling bearing unit are used for supporting the wheels of an automobile so as to be able to rotate freely with respect to the suspension. In recent years, rotational speed detectors for detecting the rotational speed of the wheels have been installed into this kind of hub unit bearing, and control of anti-lock brake systems (ABS) or traction control systems (TCS) is widely performed.

As an example of this kind of hub bearing unit with rotational speed detector, a structure such as illustrated in FIG. 24 is disclosed in JP2005-090638. The hub unit bearing with rotational speed detector of this first example of conventional construction comprises a hub unit bearing 1 and a rotational speed detector 5, and the hub unit bearing 1 comprises an outer ring member 2, a hub 3, which is an inner ring member, and a plurality of balls 4, which are rolling elements.

The outer ring member 2 has a plurality of outer raceways 6 formed around the inner circumferential surface thereof, and a stationary side flange 7 around the outer circumferential surface. The outer ring member 2 corresponds to a stationary ring that is supported by the knuckle (not illustrated in the figure) of the suspension and does not rotate during operation.

The hub 3 is a combination of a main hub 8 and inner ring 9, and has a plurality of inner raceways 10 formed around the outer circumferential surface, and is supported on the inner diameter side of the outer ring member 2 such that it is concentric with the outer ring member 2. A rotating side flange 11 for supporting the wheel is formed on a portion of the outside end in the axial direction of the main hub 8, that protrudes further outward in the axial direction than the opening on the outside end in the axial direction of the outer ring member 2. Moreover, spline holes 13 for making a spline fit with the drive shaft (not illustrated in the figure) that is fastened to the surface on the outside end in the axial direction of an outer ring 12 of a constant velocity joint is provided in the center section of the main hub 8. A plurality of balls 4 is located between each of the outer raceways 6 and the inner raceways 10 so as to be able to roll freely. The outside in the axial direction is defined as the side toward the outside in the width direction of the vehicle body when installed in the suspension, and the inside in the axial direction is defined as the side that is near the center section in the width direction of the vehicle body.

A seal ring 14 is provided between the opening section on the outside end in the axial direction of the outer ring member 2 and the outer circumferential surface of the middle section in the axial direction of the main hub 8. This seal ring 14 covers the opening on the outside end in the axial direction of the rolling element installation space 15 where the balls 14 are located, and prevents grease that is inside this space 15 from leaking to the outside, and prevents foreign matter on outside from entering into the space 15. On the other hand, a combined seal ring 16 is provided between the portion around the outer circumferential surface on the inside end section in the axial direction of the inner ring 9 that is separated toward the inside in the axial direction away from the inside inner raceway 10 that is formed around the inner ring 9 and the inner circumferential surface on the inside end section in the axial direction of the outer ring member 2, and covers the opening on the inside end in the axial direction of the space 15.

A cover 17 is fastened around the outside of the inside end section in the axial direction of the outer ring member 2. This cover 17 is formed into a circular ring shape by pressing metal plate, and a seal member 18 made using an elastic material is attached around the inner edge of the inside end in the axial direction. The edges of the tip ends of a plurality of seal lips that are formed on the seal member 18 come in sliding contact all the way around the outer circumferential surface and stepped surface on the outside end section in the axial direction of the outer ring 12 for a constant velocity joint.

On the other hand, the rotational speed detector 5 comprises an encoder 19 and sensor 20. The encoder 19 is such that the characteristics of the inside surface in the axial direction, which is the detected surface, alternate at uniform intervals in the circumferential direction, is supported and fastened such that it is concentric with the hub 3 and rotates together with the hub 3. In the example in the figures, an encoder 19, which is made using permanent magnets with the S-poles and N-poles alternating around the inside surface in the axial direction, is attached and fastened to the inside surface in the axial direction of the slinger 21 of the combined seal ring 16. Moreover, the sensor 20 has a magnetic detecting element such as a Hall element or magnetic resistance element that is provided in a detecting section, and is supported by and fastened to the cover 17. In this state, the detecting section of the sensor 20 faces the inside surface in the axial direction of the encoder 19. Furthermore, of a sensing space 22 that is located in the detecting section of the encoder 19 and the sensor 20 is such that the opening on the inside end in the axial direction is covered by the seal member 18, and the opening on the outside end in the axial direction is covered by the combined seal ring 16.

With the first example of conventional construction of a hub unit bearing 1, the wheel that is fastened to the hub 3 can supported such that it rotates freely with respect to the suspension the supports the outer ring member 2. Moreover, as the encoder 19 rotates together with the hub 3 as the wheel rotates, the N-poles and S-poles on the detected surface of the encoder 19 alternate in passing the detecting section of the sensor 20. As a result, the direction of the magnetic flux that flows in the magnetic detection element of the sensor 20 changes, and the characteristic of this magnetic detection element alternately changes. The frequency at which the characteristics of the magnetic detection element changes in this way is proportional to the rotational speed of the hub 3, so by sending the detection signal from the sensor 20 to a controller (not illustrated in the figure), it is possible to perform suitable ABS or TCS control. Furthermore, in the case of the first example of conventional construction, the sensing space 22 can be closed off from the outside space by the seal member 18 that is attached to the cover 17. Therefore, it is possible to prevent foreign matter such as sand or small stones from entering in and biting in between the inside surface in the axial direction of the encoder 19 and the detecting section of the sensor 20, and thus it is possible to protect the encoder 19 and sensor 20 from the danger of damage. As a result, the reliability of the rotational speed detection can be maintained, and suitable ABS or TCS control is possible.

However, even in the case of the first example of conventional construction, there is a possibility of moisture or minute particles entering into the sensing space 22 through a minute space between the seal member 18 and the outer ring 12 of the constant velocity joint, or through a minute space between the cover 17 and the outer ring member 2. Therefore, as the bearing is used over a long period of time, foreign matter may accumulate inside the sensing space 22, which causes a drop in reliability of the rotational speed detection.

For such a problem, as disclosed in JP2008-175382(A), JP2005-140320(A), JP2005-331429(A) and JP2005-009525 (A), the installation of a water drainage hole is performed. FIG. 25 shows a second example of conventional construction of hub unit bearing 1a which is disclosed in JP2008-175382(A). In the case of this second example of conventional construction, a water drainage hole 23 is formed in the portion of a cover 17a that is fastened to the inside end section in the axial direction of the outer ring member 2 that is located on the bottom end during operation. More specifically, the cover 17a comprises a large-diameter cylindrical section 24 for fastening around the inside end section in the axial direction of the outer ring member 2, a circular ring shaped circular disk section 25 that is bent at a right angle toward the inside in the radial direction from the inside end section in the axial direction of the large-diameter cylindrical section 24, and a small-diameter cylindrical section 26 that is bent at a right angle toward the inside in the axial direction from the inside end section in the radial direction of the circular disk section 25. The water drainage hole 23 is formed in the inner half section in the axial direction of the large-diameter cylindrical section 24 so as to pass through the large-diameter cylindrical section 24, connecting the inside and outside of the cover 17.

In this second example of conventional construction, foreign matter such as moisture or minute particles that has entered into the sensing space 22 can be discharged to the outside space through the water drainage hole 23. Therefore, it is possible to prevent foreign matter from accumulating inside the sensing space 22, and thus it is possible to maintain reliability of the rotational speed detection. It is omitted in the figures, however, in the case of the construction of the invention disclosed in JP2005-140320(A), JP2005-331429(A) and JP2005-009525(A) as well, a water drainage hole is formed in the portion of the cover that is located at the bottom of the cover during operation. Therefore, as in the case of the second example of conventional construction, it is possible to discharge foreign matter that entered into the sensing space to the outside space.

Incidentally, in any of the construction disclosed in JP2008-175382(A), JP2005-140320(A), JP2005-331429(A) and JP2005-009525(A), including the second example of conventional construction, the only intention for the water drainage hole is to discharge foreign matter to the outside space, and preventing foreign matter from entering from that outside space through this water drainage hole is not particularly considered. In other words, when foreign matter such as water from a car wash, or dirty water that is splashed on the vehicle during operation, much of that foreign matter is comes near the cover 17 from underneath. As can be clearly seen in FIG. 25, a water drainage hole 23 that is formed in the cover 17a is a simple hole that is formed in the bottom section of the large-diameter cylindrical section 24, and as seen from the bottom of the vehicle, the entire opening section of the water drainage hole 23 is exposed. Consequently, it is easy for foreign matter such as dirty water to enter inside the cover 17a through this water drainage hole 23. Therefore, there is a possibility that the reliability of rotational speed detection will drop due to foreign matter adhering to the inside surface in the axial direction of the encoder and to the detecting section of the sensor 20. Moreover, there is a possibility that the strength of the portion of the cover 17 which is fitted around the outer ring member 2 will decrease with location where the water drainage hole 23 is formed.

RELATED LITERATURE

Patent Literature

[Patent Literature 1] JP2005-090638(A)
[Patent Literature 2] JP2008-175382(A)
[Patent Literature 3] JP2005-140320(A)
[Patent Literature 4] JP2005-331429(A)
[Patent Literature 5] JP2005-009525(A)

SUMMARY OF THE INVENTION

Problem to be Solved by the Invention

In consideration of the problems above, the inventors attempted to improve the construction of the water drainage hole that is formed in the cover as illustrated in FIG. 26 to FIG. 31. In this case, this bearing unit 1 comprises a cover 17b, a large-diameter cylindrical section 27, a side wall section 28, a small-diameter cylindrical section 29, a circular disk section 30 and an inner-diameter cylindrical section 31.

The large-diameter cylindrical section 27 is fitted and fastened around the end section in the axial direction of the outer ring member 2. The side wall section 28 is formed by bending from the inside end section in the radial direction of the large-diameter cylindrical section 27 at a right angle inward in the radial direction, and except for portions in the circumferential direction (the portions on the top end and the bottom end in the operating state), the outside surface in the axial direction comes in contact with the surface on the inside end in the axial direction of the outer ring member 2. The small-diameter cylindrical section 29 is formed bending from the inside end section in the radial direction of the side wall section 28 at a right angle inward in the axial direction. The circular disk section 30 is formed by bending from the inside end section in the axial direction of the small-diameter cylindrical section 29 at a right angle inward in the radial direction. The inner-diameter cylindrical section 31 is formed by bending from the inside end section in the radial direction of the circular disk section 30 at a right angle outward in the axial direction, and is located on the inside in the radial direction of the small cylindrical section 29

A bulging section 32 is formed by having the portion of the side wall section of the cover 17b located on the bottom end in the operating state bulge inward in the axial direction, and the water drainage hole 23a is formed in a state that passes through the surfaces on both the inside and outside of this bulging section 32.

As illustrated in FIG. 28, in the case of this construction, even when the cover 17b is viewed from underneath the vehicle, the opening section of the water drainage hole 23a is not exposed. Therefore, it becomes difficult for foreign matter such as dirty water that is splashed during operation of the vehicle to enter inside the cover 17b. Moreover, in the case of water drops that move in a spiral shape by riding on the wind around the tire that is caused by the rotating tire as well, the side surface of the outer perimeter of the bulging section 32 is covered, so it is difficult for foreign matter to enter into the cover 17b. FIG. 29 illustrates construction wherein the side surfaces in the circumferential direction of the bulging section 32 are raised at nearly right angles inward in the axial direction, however, as the shape of this portion, by adopting inclined surfaces which are inclined in a direction such that the width of the opening section becomes narrow toward the inside in the axial direction as illustrated in FIG. 30 and FIG. 31A, or curved surfaces as illustrated in FIG. 31B, the flow of air can be rectified so as to further increase the effect of preventing water drops from entering.

However, in the case of this construction, it is necessary to form the bulging section 32 on the cover 17b, so it is necessary to uses a highly ductile material as the material for the cover 17b, which together with lower the freedom of material selection, also increases the processing cost. Moreover, for a cover 17b made using a highly ductile material, there is a problem in that it is not possible to sufficiently maintain the strength of the fit with the outer ring member 12. Therefore, practical implementation of this construction is considered to be difficult.

Therefore, the object of the present invention is to provide construction of a cover in a hub unit bearing that has no problem with the strength of the fit with the outer ring member, and together with being able to suppress foreign matter such as dirty water from entering inside, is also able to easily discharge foreign matter that has entered inside.

Means for Solving the Problems

The hub unit bearing of the present invention comprises: an outer ring member, which is a stationary ring; an inner ring member, which is a rotating ring that can rotate relative to the outer ring member via a plurality of rolling elements; and a cover that covers the inside end sections in the axial direction of the outer ring member and inner ring member. More specifically, the outer ring member has a plurality of rows of outer raceways formed around the inner circumferential surface, and during operation, is a stationary ring that is supported by the suspension and does not rotate; the inner ring member has a plurality of rows of inner raceways formed around the outer circumferential surface, is located on the inner-diameter side of the outer ring member such that it is concentric with the outer ring member, comprises a flange that is formed around the outside end section in the axial direction and supports the wheel, and during operation is a rotating ring that rotates together with the wheel; the plurality of rolling elements are located in each row between both the outer raceway and the inner raceway, such that they can roll freely; and with this construction it is possible to support the inner ring member such that it can rotate freely.

The present invention can be applied to both the unit for drive wheel and for follower wheel.

In the hub unit bearing of a first aspect of the present invention, the cover has a disk section, and a cylindrical section that is bent outward in the axial direction from the outer perimeter edge section of the disk section, and is fitted with and fastened to the outer ring member. The cylindrical section comprises a cut and raised section that is formed in part in the circumferential direction of the cylindrical section by being cut and raised toward the inside or outside in the radial direction of the cylindrical section, such that this cut and raised section forms a water drainage hole that passes through from the inside to the outside of the cover.

The cut and raised section can be cut and raised by cutting two cutting-plane lines along the circumferential direction of the cylindrical section. In this case, water drainage holes can be formed on both sides in the axial direction of the cut and raised section.

The cut and raised section can also be cut and raised by cutting one cutting-plane line along the circumferential direction of the cylindrical section. In this case, one side in the axial direction of the cut and raised section is continuous with the cylindrical section, and the water drainage hole is formed on the other side in the axial direction. In this case, except for both sides in circumferential direction that are continuous with the cylindrical section, the cut and raised section can have an L-shaped cross section or a linear shaped cross section in the cross section in the axial direction of the cover (cross section in a virtual plane that includes the center axis of the cover).

In the hub unit of a second aspect of the present invention as well, the cover comprises a disk section, and a cylindrical section that is bent outward in the axial direction from the perimeter edge section of the disk section, and is fitted with and fastened to the outer ring member. In this second aspect, comprises a groove section that is recessed toward the inside or the outside in the radial direction along the axial direction, and a water drainage hole that passes through from the inside to the outside of the cover is formed in the portion between the groove section and the outer ring member.

The groove section is formed in the cylindrical section such that the groove section is parallel with the axial direction of the cover. Alternatively, the groove section is formed in the cylindrical section such that the groove section is inclined with respect to the axial direction of the cover.

In the hub unit bearing of a third aspect of the present invention as well, the cover has a disk section, and a cylindrical section that is bent outward in the axial direction from the perimeter edge section of the disk section, and is fitted with and fastened to the outer ring member. In this third aspect, the cylindrical section comprises at least: a large-diameter cylindrical section that is fitted onto and fastened to the inside end section in the axial direction of the outer ring member; a side wall section that is bent inward in the radial direction from the inside end section in the axial direction of the large-diameter cylindrical section, with the outside surface in the axial direction thereof coming in contact with the surface on the inside end in the axial direction of the outer ring member; and a small-diameter cylindrical section that is continuous with the disk section and is bent inward in the axial direction from the inside end section in the radial direction of the side wall section.

A water drainage hole is formed in the portion in part in the circumferential direction of the cylindrical section that connects the small-diameter cylindrical section and the side wall section. Moreover, the bottom end section of the water drainage hole located in the middle section in the radial direction of the side wall section and is located further downward then the bottom end section of the inner circumferential surface of the inside end section in the axial direction of the outer ring member.

In the hub unit bearing of a third aspect of the invention as well an inner-diameter cylindrical section is bent outward in the axial direction from the inside end section in the radial direction of the disk section; wherein the inner circumferential surface of the inner-diameter cylindrical section functions as a seal surface with which the edge on the tip end of the seal member made of elastic material, which is a seal that is provided between the cover and the inner ring member or separate member (for example the outer ring for a constant velocity joint) that rotates together with the inner ring member, comes in sliding contact or closely faces all around in the circumferential direction.

In any of the aspects of the present invention, during operation, the water drainage hole can located in the portion of the cover located at the bottom portion, and more specifically, can be located within a range of ±35° in the circumferential direction with an intersection point where a plumb line that passes through the center axis of the cover crosses the bottom end section of the cover.

In both the first aspect and second aspect of the present invention, the cylindrical section can be constructed so as to comprise: a large-diameter cylindrical section that is fitted and fastened around the outside or inside of the inside end section in the axial direction of the outer ring member; a side wall section that is bent inward in the radial direction from the inside end section in the axial direction of the large-diameter cylindrical section, the outside surface in the axial direction thereof coming in contact with the surface on the inside end in the axial direction of the outer ring member; or a flange section that protrudes outward in the radial direction from the inside end section in the axial direction of the large-diameter cylindrical section, and is bent inward in the radial direction, the outside surface in the axial direction thereof coming in contact with the surface on the inside end in the axial direction of the outer ring member; and a small-diameter cylindrical section that is bent inward in the axial direction from the side wall section or the flange section. In this case, in the first aspect of the invention, the cut and raised portion can be formed in the small-diameter cylindrical section. In the second aspect of the invention, the groove section can be formed in the large-diameter cylindrical section.

In all of the aspects of the present invention, the disk section includes, for example, a disk shaped member that is employed in the case of a hub unit bearing for a follower wheel and that covers the entire radial direction on the inside end in the axial direction, and, for example, a circular ring shaped member that is employed in the case of a hub unit bearing for a drive wheel, and that closes off the space between the outer ring member and the outer ring for a constant velocity joint. In the case of the latter, a seal member made of an elastic material can be provided on the inside end section (inner perimeter edge section) in the radial direction, and the edge on the tip end of the seal lip of the seal member can come in sliding contact all the way around the outer circumferential surface of the inside end section in the axial direction of the inner ring member, or the outer circumferential surface on the outside end section in the axial direction or the step surface of the outer ring for the constant velocity joint.

Furthermore, in the case of the hub unit bearing of any of the aspects of the invention, construction capable of detecting the rotation of the inner ring member is possible, wherein an encoder is provided on the outer circumferential surface of the inside end section in the axial direction of the inner ring member, which is a rotating ring, and a sensor having a detecting section that faces the encoder is provided in part of the cylindrical section or disk section of the cover.

Effect of the Invention

With the hub unit bearing of the present invention, having the construction described above, it is possible to maintain the strength of the fit of the cover with the outer ring member, and it is possible to achieve construction that makes it difficult for foreign matter such as muddy water to enter through a water drainage hole that is formed in the cover, as well as makes it possible for foreign matter to drain without building up inside the internal space.

In other words, in the case of the first aspect of the hub unit bearing, a water drainage hole that passes from the inside to the outside of the cover is formed in the cylindrical section of the cover by a cut and raised section that is formed by cutting and raising part of the cylindrical section in the radial direction. Part of the cut and raised section of this kind of water drainage hole is connected with the cylindrical section, so the strength of the cylindrical section is maintained. Therefore, it is possible to maintain the strength of the fit of the cover with the outer ring member. Moreover, when the cover is viewed from underneath (outside in the radial direction) the vehicle, the water drainage hole is not exposed (the water drainage hole is not open directly to the outside), so it is possible to effectively prevent foreign matter such as water from entering inside the cover through the water drainage hole.

In the case of the hub unit bearing of the second aspect of the present invention, a concave groove section is formed along the axial direction of the cylindrical section of the cover, and a tunnel shaped water drainage hole is formed between this groove section and the outer ring member. Consequently, the water drainage hole can be formed without having to cut the cylindrical section. Therefore, it is possible to maintain the strength of the cylindrical section, and thus it is also possible to maintain the strength of the fit of the cover with the outer ring member. Moreover, when the cover is viewed from underneath (outside in the radial direction) the vehicle, the water drainage hole is not exposed, so it is possible to effectively prevent foreign matter such as water from entering inside the cover through the water drainage hole. Furthermore, there is no cut surface through the cover, so it is not necessary to perform masking when performing rust proofing process such as coating of the cover, so rust proofing can be performed easily, and thus the cover can have excellent rust proof characteristics.

In the case of the hub unit bearing of a third aspect of the present invention, the water drainage hole is formed in the portion that connects the small-diameter cylindrical section and the side wall section of the part of the cover that is located at the bottom during operation, with the bottom section of the portion that is opened in the side wall section being located in the middle section in the radial direction of the side wall section so as not to lead to the outer perimeter section. Therefore, when the cover is viewed from underneath the vehicle, the portion of the water drainage hole that is opened into the side wall section is not exposed. As a result, it becomes difficult for foreign matter such as muddy water that is splashed up while the vehicle is traveling to enter through the opening in the side wall side into the internal space (sensing space) where, for example, the encoder or detecting section of the sensor are located.

Moreover, there is an inner-diameter cylindrical section of the cover that is located inward in the radial direction of the portion of the water drainage hole that is opened into the small-diameter cylindrical section of the cover, so foreign matter that enters in from the opening in the small-diameter section is thrown back by the outer circumferential surface of this inner-diameter cylindrical section, or after matter has adhered to the outer circumferential of this inner-diameter cylindrical section, the matter drips down and is drained to the outside. Therefore, it becomes difficult for foreign matter such as dirty water to enter inside the internal space through the opening in the small-diameter cylindrical section. In this third aspect of the present invention, it is possible in this way to keep foreign matter from entering inside the internal space through the water drainage hole.

Furthermore, the bottom end section of the water drainage hole that is opened into the side wall section is located further downward than the bottom end section of the inner circumferential surface of the inside end section in the axial direction of the outer ring member, so it is possible to effectively prevent foreign matter from building up between the inner circumferential surface on the inside end section of the outer ring member and the outside surface in the axial direction of the side wall section, and by taking advantage of force of gravity, it is possible for foreign matter to efficiently drain to the outside space.

In this construction, it is not necessary to form a bulge section for forming a water drainage hole in part of the cover, so together with being able to prevent a reduction in freedom of the selection of material for the cover, it is possible to prevent an increase in processing costs. Moreover, the cover can be fitted and fastened to the outer ring member with sufficiently large strength.

BRIEF DESCRIPTION OF THE DRAWINGS

FIG. 1 is a cross-sectional view of a first embodiment of a hub unit bearing of the present invention.

FIG. 2 is an enlarged view of A in FIG. 1.

FIG. 3 is a cross-sectional view of section I-I of the cover illustrated in

FIG. 2.

FIG. 4 is an enlarged perspective view of a water drainage hole in the cover illustrated in FIG. 2.

FIG. 5 is a schematic drawing illustrating the phase of the water drainage hole.

FIG. 6 is an enlarged cross-sectional view of the major parts of a first variation of the cover of the first embodiment of the present invention.

FIG. 7 is an enlarged cross-sectional view of the major parts of a second variation of the cover of the first embodiment of the present invention.

FIG. 8 is an enlarged cross-sectional view of the major parts of a third variation of the cover of the first embodiment of the present invention.

FIG. 9 is an enlarged cross-sectional view of the major parts of a fourth variation of the cover of the first embodiment of the present invention.

FIG. 10 is an enlarged cross-sectional view of the major parts of a fifth variation of the cover of the first embodiment of the present invention.

FIG. 11 is a cross-sectional view illustrating a second embodiment of the hub unit bearing of the present invention.

FIG. 13 is a bottom view illustrating a variation of the cover of this second embodiment.

FIG. 14 is an enlarged cross-sectional view of the major parts of a third embodiment of the hub unit bearing of the present invention.

FIG. 15 is a cross-sectional view of a fourth embodiment of the hub unit bearing of the present invention.

FIG. 16 is an enlarged view of B in FIG. 15.

FIG. 17 is a cross-sectional view illustrating a removed cover and sensor of the fourth embodiment.

FIG. 18 is a view as seen from the right in FIG. 17.

FIG. 19 is a view of the cover as seen from the bottom in FIG. 18.

FIG. 20 is a perspective view illustrating the portion near the bottom end of the cover.

FIG. 21 is a drawing similar to FIG. 20, and illustrates a first variation of the fourth embodiment of the present invention.

FIG. 22 is a drawing similar to FIG. 16, and illustrates a second variation of the fourth embodiment of the present invention.

FIG. 23 is a cross-sectional view illustrating the state of performing a grinding process of the outer surface of the inner ring.

FIG. 24 is a cross-sectional view illustrating a first example of conventional construction of a hub unit bearing.

FIG. 25 is a cross-sectional view illustrating a second example of conventional construction of a hub unit bearing.

FIG. 26 is a cross-sectional view illustrating a hub unit bearing of a prior invention.

FIG. 27 is a drawing of a removed cover and sensor as seen from the right side in FIG. 26.

FIG. 28 is a drawing of the cover as seen from the bottom in FIG. 27.

FIG. 29 is a perspective view illustrating the portion near the bottom end of the cover.

FIG. 30 is a drawing that corresponds to FIG. 29, and illustrates a devised shape of the portions on both sides in the circumferential direction of the water drainage hole of the bulge section of the cover.

FIG. 31 is a cross-sectional view illustrating a second example of the portions on both sides in the circumferential direction of the water drainage hole.

ILLUSTRATIVE EMBODIMENTS FOR CARRYING OUT THE INVENTION

[Embodiment 1]

Figure 12A:
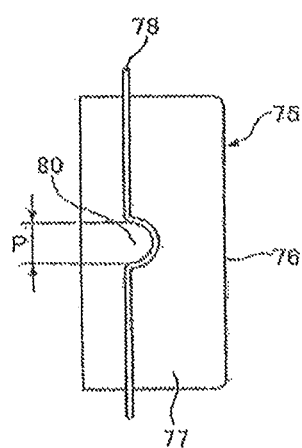
FIG. 12A is a bottom view of the cover illustrated in FIG. 11.

FIG. 1 to FIG. 10 illustrate a first embodiment of a hub unit bearing of the present invention. The hub unit bearing 33 of this embodiment is a hub unit bearing unit for a drive wheel, and as illustrated in FIG. 1, comprises an outer ring member 34, a hub 35 as an inner ring member, a plurality of balls 36 as rolling elements, seals 37a, 37b, an rotational speed detector 38 and a cover 39.

The outer ring member 34 is a stationary ring and is fastened inside a retaining hole 41 of a knuckle 40 that is fastened to the vehicle (not illustrated in the drawings), and by connecting a stationary-side flange 42 that is formed around the outer circumferential surface of the outer ring member 34 to the knuckle 40 using bolts 43, the outer ring member 34 is connected and fastened to the knuckle 40.

The hub 35 is a rotating ring and is an integrated combination of a main hub 44 and a separate inner ring 45, and this hub 35 is supported on the inner diameter side of the outer ring member 34 such that it is concentric with the outer ring member 34. The main hub 44 is a circular column shaped member having a rotating-side flange 46 that is formed around the outer circumferential surface of the outside end in the axial direction (left end in FIG. 1) such that it extends outward in the radial direction from the outer circumferential surface. Hub bolts 47 for connecting to the wheel and brake rotor (not illustrated in the drawings) are implanted in the rotating-side flange 46 such that they are evenly spaced around the circumferential direction. Spline holes 48 for making a spline fit with the spline shaft of a constant velocity joint (not illustrated in the drawings) are formed on the inner circumferential surface of the main hub 44.

A small-diameter stepped section 49 is formed around the inside end (right side in FIG. 1) in the axial direction of the main hub 44. An inner ring 45 is fitted onto this small-diameter stepped section 49, after which the inner ring 45 is connected and fastened to the main hub 44 by crimping the end section in the axial direction of the small-diameter stepped section 49. By pressing the inner ring 45 with this crimping, proper pre-loading is applied to the balls 36.

Double rows of outer raceways 50a, 50b that are parallel with each other in the axial direction are formed around the inner circumferential surface of the outer ring member 34. Moreover, inner raceways 51a, 51b are respectively formed around the outer circumferential surfaces of the main hub 44 and the inner ring 45 such that they correspond with the outer raceways 50a, 50b of the outer ring member 34. Balls 36 are located in the raceways that are formed by the inner raceways 51a, 51b and the outer raceways 50a, 50b, and are held by a retainer 52 so that they are evenly spaced in the circumferential direction and so that they can roll freely These balls 36 come in contact with the outer raceways 50a, 50b and inner raceways 51a, 51b at specified angles with each other to form a back-to-back duplex bearing (DB). As a result, the main hub 44 is able to rotate around the center axis (CL) of the outer ring member 34.

A seal 37a is provided between the opening section on the outside end in the axial direction of the outer ring member 34 and the outer circumferential surface in the middle section in the axial direction of the main hub 44. On the other and, a seal 37b is provided between the opening section on the inside end in the axial direction of the outer ring member 34 and the outer circumferential surface of the inner ring 45. These seals 37a, 37b seal both end sections in the axial direction of the rolling element installation space 53 where the balls 36 of the hub unit bearing 33 are located, and together with preventing grease in this space from leaking out, prevent various foreign mater such as rain water, mud, dust and the like on the outside from entering inside the rolling element installation space 53.

The seal 37b comprises a metal core 55 having an L-shaped core that is pressure fitted into and fastened to the inner circumferential surface 54 on the inside end section in the axial direction of the outer ring member 34, an elastic seal section 56 that is formed using rubber and the like and is fastened to the core 55, and a slinger 59 that is pressure fitted around and fastened to the outer circumferential surface 57 of the inner ring 45 and comes in sliding contact with three seal lips 58 of the elastic seal section 56.

The rotational speed detector 38 comprises an encoder 60 and a sensor 61. The encoder 60 is attached and fastened to the side surface of the slinger 59. Moreover, the sensor 61 is located such that the detecting section 62 thereof is close to the detected surface 63 of the encoder 60. The encoder 60 is a rubber magnet or plastic magnet, in which a ferromagnetic material such as ferrite or rare-earth element is mixed inside rubber or synthetic resin, and is formed into a circular ring shape and magnetized. The magnetization direction alternately changes at equal intervals in the circumferential direction.

The cover 39 has a circular disk section 65 that is formed by pressing metal plate that is rust proof such as stainless steel plate or galvanized steel plate, and has a through hole 64 though which a spline shaft of a constant velocity joint (not illustrated in the drawings) passes through, and a small-diameter cylindrical section 66 and large-diameter cylindrical section 67 that are formed by bending the outer perimeter edge section of the circular disk section 65 outward in the axial direction in two stages. The large-diameter cylindrical section 67 fits around the outer circumferential surface 68 of the inside end section in the axial direction of the outer ring member 34, and the stepped section 69, which connects the small-diameter cylindrical section 66 and the large-diameter cylindrical section 67, is brought into contact with the surface 70 on the inside end in the axial direction of the outer ring member 34.

As illustrated in FIG. 2 to FIG. 4, a cut and raised section 71 is formed in the small-diameter cylindrical section 66. This cut and raised section 71 is formed by cutting two cutting-plane lines that are parallel along the circumferential direction of the small-diameter cylindrical section 66, and raised toward the inside in the radial direction of the small-diameter cylindrical section 66. The cut and raised section 71 is also cut and raised in a band shape from small-diameter cylindrical section 66 so as to have a trapezoidal cross-sectional shape where both end sections in the circumferential direction of the cut and raised sections 71 are continuous with the small-diameter cylindrical section 66, and both side sections in the axial direction of the cut and raised section 71 are separated from (detached from) the small-diameter cylindrical section 66. As a result, a water drainage hole 73 that passes through from the inside to the outside of the cover 39 is formed on both sides in the axial direction of the cut and raised section 71.

The sensor 61 is inserted through a sensor hole that is formed in the small-diameter cylindrical section 66 of the cover 39, and the detecting section 62 of the sensor 61 is located so as to face the detected surface 63 of the encoder 60. As the encoder 60 rotates together with the main hub 44 and inner ring 45, the output from the sensor 61 changes at a frequency that is proportional to the rotational speed, and the rotational speed of the wheel (not illustrated in the drawings) is detected.

As illustrated in FIG. 5, preferably a water drainage hole 73 is located at position D in the bottom end section of the cover 39, and position A1 within a range of 10° to 35° in the circumferential direction of rotation when the vehicle is travelling forward from the intersection point where a vertical line VL passes through the center axis of the cover 39. Here, position D is a position where water can drain easily due to gravity when the vehicle is stopped, and position A1 is position where water that is splattered by the rotation of the encoder 60 can drain.

Normally, a vehicle travels in the forward direction the majority of the time, so forming the water drainage holes 73 at position D and A1 as described above is suitable, however, when, for convenience of manufacturing or management, the cover 39 is made to be used by either the left or right wheel and it is not possible to specify the direction of rotation, a third water drainage hole 73 could also be located at a position A2 that is axially symmetrical to position A1 with respect to the vertical line VL. The number of water drainage holes 73 is arbitrary, and it is also possible to have four or more.

Furthermore, in the case of a bearing that is used in a normal passenger vehicle or a freight vehicle, preferably the water drainage holes are located at a total of two positions, position D and at a position 6° to 12° in the direction of rotation from the vertical line VL when the vehicle is traveling in the forward direction. Here, the reason for the angle being 6° to 12° is that on a good flat and paved road the acceleration/deceleration of an automobile that is being driven safely within the legal speed limit is normally 0.1 G to 0.2 G, so the tangent (tan) of the acceleration and gravity is within the range 0.1 to 0.2.

In the case of a vehicle that often travels over poor roads, when taking the instantaneous acceleration/deceleration or orientation of the vehicle into consideration, a position at a larger angle, for example 20° to 30° is preferred, and in the case of a vehicle that is used for construction or farming, or a 4-wheel drive vehicle, the vehicle often travels forward or backward at low speed over uneven terrain, so preferably water drainage holes are used at a total of three location, position D above, and one location at a position 10° to 25° on both sides in the circumferential direction from the vertical line VL. Furthermore, when the water drainage hole is located at an angle 6° to 12°, it is also possible to form one elongated water drainage hole instead of a plurality of holes.

Moreover, as illustrated in FIG. 3, the length (L) in the circumferential direction of each water drainage hole 73 is preferably 4 to 10 times the raw material plate thickness (t). This is because when the length (L) in the circumferential direction is less than 4 times the plate thickness (t), the cutting and raising process is difficult, and when the length (L) is greater than 10 times the plate thickness (t), the rigidity of the small-diameter cylindrical section 66 decreases due to the cut and raised section 71, and together with being difficult to maintain a proper slit width, there is a possibility that the strength of the small-diameter cylindrical section will be affected. Furthermore, when water drainage holes are formed at a plurality of locations, from the aspect of strength, preferably the total of the lengths (L) of the water drainage holes 73 is 5% to 10% the length of the outside perimeter of the small-diameter cylindrical section.

As illustrated in FIG. 3, the height (H) of a water drainage hole 73 is arbitrary, however preferably is 0.5 mm or greater and is equal to or less than the plate thickness (t). This is because when the height (H) is less than 0.5 mm, there is possibility that water will not sufficiently drain due to interfacial tension of water, and when the height (H) is greater than the plate thickness (t), not only is processing difficult, the area of the opening of the water drainage hole 73 becomes large and possibility that foreign matter will enter through the hole increases. In FIG. 3, in order to more easily understand the construction of the water drainage hole 73, the height (H) of the water drainage hole 73 is represented as being larger than the plate thickness (t).

Furthermore, as illustrated in FIG. 2, the width (W) in the axial direction of the cut and raised section 71 is preferably at least 2 times the plate thickness (t). For the same reason as described above, preferably the space (C) between the surface on the inside end in the axial direction of the cut and raised section 71 and the inside surface of the disc section 65 is at least 2 times the plate thickness (t). When the space (C) is too small, there is a possibility that water will not sufficiently drain due to interfacial tension of water. In FIG. 2, in order to more easily understand the construction of the cut and raised section 71, the space (C) is represented as being smaller than 2 times the plate thickness (t).

The material of the cover 39 is preferably a non-magnetic material such as an austenitic stainless steel. In the case of an austenitic stainless steel, the cut and raised section can be formed by pressing, and the material does not hold abrasive powder that is magnetized by receiving a mechanical force, and does not attract and hold iron sand or dust from the road with a magnetic force. Moreover, the shape of the cut and raised section 71 is arbitrary, and is not limited to having a trapezoidal cross-sectional shape as illustrated in FIG. 3; for example, it could also having a triangular or arc shaped cross-sectional shape.

As was explained above, with the hub unit bearing 33 of this embodiment, it is possible for foreign matter such as water that entered inside the cover 39 to effectively drain from the water drainage holes 73 that are formed in the bottom section of the cover 39. Moreover, in the case of the hub unit bearing 33 of this embodiment, the portions (the both ends in the circumferential direction) of the cut and raised sections 71 for forming the water drainage holes 73 that pass through from the inside to the outside of the cover are connected to the small-diameter cylindrical section 66, so the strength of the small-diameter cylindrical section 66 is maintained. Therefore, with the cover 39 having this kind of construction, it is possible to maintain the strength of the fit with the outer ring member 34.

Furthermore, the shape of the water drainage hole 73 differs from the shape of a conventional water drainage hole, and when viewed from the bottom (outward in the radial direction) of the cover 39, the front surface of the opening is covered by the band shaped cut and raised section 71 such that the opening portion of the water drainage hole is not exposed (the water drainage hole 73 is not directly open to the outside), so it is possible to effectively prevent foreign matter such as water from entering inside the cover 39.

[Embodiment 1, Variation 1]

FIG. 6 illustrates a first variation of this first embodiment of the present invention. A cover 39A as illustrated in FIG. 6 can also be used as the cover to cover the inside end sections in the axial direction of the outer ring member 34 and hub 35. This cover 39A does not have a small-diameter cylindrical section, but only a large-diameter cylindrical section 67, and a cut and raised section 71 that is formed in the large-diameter cylindrical section 67 is formed so as to protrude toward the inside in the radial direction. The cover 39A is assembled so that the tip end section (outside end section in the axial direction) of the large-diameter cylindrical section 67 fits around the outer circumferential surface 68 of the outer ring member 34, and the surfaces on the outside end in the axial direction (surface on the left end) of the cut and raised section 71 comes in contact with the surface 70 on the inside end of the outer ring member 34. With this variation, of the two water drainage holes 73 that are formed on both sides in the axial direction of the cut and raised section 71, one of the water drainage holes 73 (left side in FIG. 6) is covered by the outer ring member 34, so it is possible to effectively prevent foreign matter such as water from entering inside the cover 39A.

[Embodiment 1, Variation 2]

FIG. 7 illustrates a second variation of the first embodiment of the present invention. It is also possible to use a cover 39B such as illustrated in FIG. 7 as the cover that covers the inside end sections in the axial direction of the outer ring member 34 and the hub 35. In this cover 39B, a cut and raised section 71 is formed so as to protrude toward the outside in the radial direction, and water drainage holes 73 are formed in the portions on both sides in the axial direction of the cut and raised section 71.

[Embodiment 1, Variation 3]

FIG. 8 illustrates a third variation of the first embodiment of the present invention. It is also possible to uses a cover 39C such as illustrated in FIG. 8 as the cover that covers the inside end sections in the axial direction of the outer ring member 34 and the hub 35. This cover 39C is such that part of the small-diameter cylindrical section 66 is cut with one cutting-plane line 72C along the circumferential direction at a location near the disk section 65, and by raising that portion toward the inside in the radial direction, a cut and raised section 71C having an L-shaped cross section (crank-shaped cross section) is formed in the small-diameter cylindrical section 66. Therefore, the outside in the axial direction (left side in FIG. 8) of the cut and raised section 71C is continuous with the small-diameter cylindrical section 66, and the inside in the axial direction (right side in FIG. 8) is detached from the small-diameter cylindrical section 66, and a water drainage hole 73 is formed in the detached portion.

With this variation, the water drainage hole 73 is only formed on the inside in the axial direction of the cut and raised section 71C (right side in FIG. 8), so when compared with the case wherein holes are formed on both sides in the axial direction, it is possible to further prevent foreign matter such as water from entering inside the cover 39C.

[Embodiment 1, Variation 4]

FIG. 9 illustrates a fourth variation of this first embodiment of the present invention. It is also possible to use a cover 39D such as illustrated in FIG. 9 as the cover that covers the inside end sections in the axial direction of the outer ring member 34 and hub 35. This cover 39D is such that part of the small-diameter cylindrical section 66 is cut with one cutting-plane line 72D along the circumferential direction at a location near the disk section 65, and by raising that portion toward the inside in the radial direction, a cut and raised section 71D having linear cross section is formed in the small-diameter cylindrical section 66 such that it extends diagonally upward toward the inside in the axial direction from the small-diameter cylindrical section 66. Therefore, the outside in the axial direction (left side in FIG. 9) of the cut and raised section 71D is continuous with the small-diameter cylindrical section 66, and the inside in the axial direction (right side in FIG. 9) is detached from the small-diameter cylindrical section 66, and a water drainage hole 73 is formed in the detached portion.

With this variation, the water drainage hole 73 is only formed on the inside in the axial direction of the cut and raised section 71D (right side in FIG. 9), so when compared with the case wherein holes are formed on both sides in the axial direction, it is possible to further prevent foreign matter such as water from entering inside the cover 39D.

[Embodiment 1, Variation 5]

FIG. 10 illustrates a fifth variation of this first embodiment of the present invention. It is also possible to use a cover 39E such as illustrated in FIG. 10 as the cover that covers the inside end sections in the axial direction of the outer ring member 34 and hub 35. This cover 39E is such that part of the small-diameter cylindrical section 66 is cut with one cutting-plane line 72E along the circumferential direction at a location separated from the disk section 65 (position opposite in the axial direction from the disk section 65), and by raising that portion toward the outside in the radial direction, a cut and raised section 71E having linear cross section is formed in the small-diameter cylindrical section 66 such that it extends diagonally downward toward the outside in the axial direction from the small-diameter cylindrical section 66. Therefore, the inside in the axial direction (right side in FIG. 10) of the cut and raised section 71E is continuous with the small-diameter cylindrical section 66, and the outside in the axial direction (left side in FIG. 10) is detached from the small-diameter cylindrical section 66, and a water drainage hole 73 is formed in the detached portion.

With this variation, the water drainage hole 73 is open toward the outside in the axial direction, and this opening section is surrounded by the cut and raised section 71E, the large-diameter cylindrical section 67 and the stepped section 69 such that it is not exposed to the outside, so it is possible to further prevent foreign matter such as water from entering inside the cover 39E.

[Embodiment 2]

Next, a second embodiment of a hub unit bearing of the present invention will be explained with reference to FIG. 11 to FIG. 13. The same reference numbers are given to parts that are the same or equivalent to parts in the first embodiment, and explanations of those parts will be omitted or simplified.

As illustrated in FIG. 11, the hub unit bearing 33A of this embodiment is a hub unit bearing for a follower wheel, and comprises an outer ring member 34A, a hub 35A as an inner ring member, a plurality of balls 36A as rolling elements, seals 37A, 37B and a cover 75.

The cover 75 has a disk section 76, and a cylindrical section 77 that is formed by bending outward in the axial direction from the outer perimeter edge of disk section 76. A flange section 78 that protrudes outward in the radial direction is formed around the outer circumferential surface in the middle section in the axial direction of the cylindrical section 77, and with the outside surface of this flange section 78 brought into contact with the surface 70A on the inside end of the outer ring member 34A, the cover 75 is fitted inside the inner circumferential surface 79 of the outer ring member 34A.

Figure 12B:
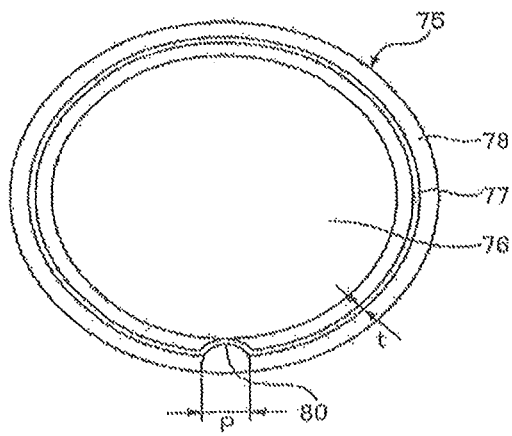
FIG. 12B is a left side view of the cover illustrated in FIG. 11.

Moreover, as illustrated in FIG. 11, FIG. 12A and FIG. 12B, a groove section 80 having a semicircular cross section and recessed toward the inside in the radial direction is formed in the tip end side (outside in the axial direction, and the left side in FIG. 11) of the cylindrical section 77 of the cover 75. This groove section 80 is parallel with the axis line, and is formed at a position in the axial direction that goes beyond the flange section 78 a little. Therefore, as illustrated in FIG. 12A, the flange section 78 is curved inward in the axial direction (toward the side of the disk section 76) in the portion of the groove section 80.

By fitting the cover 75 inside the inner circumferential surface 79 of the outer ring member 34A, a tunnel-shaped water drainage hole 81 having an L-shaped cross section (cross section with respect to a virtual plate that includes the center axis of the cover 75) is formed between the groove section 80 and the inner circumferential surface 79 and the surface 70A on the inside end of the outer ring member 34A. In the case of this embodiment, the flange section 78 is formed on the cylindrical section 77 of the cover 75, so even when the groove section 80 that will become the fitting section is formed in the cylindrical section 77, it is possible to keep the rigidity of the cylindrical section 77 from decreasing. Therefore, it is possible to firmly fit the cover 75 inside the outer ring member 34A.

Moreover, in the case of this embodiment, the width (P) in the circumferential direction of the water drainage hole 81 (groove section 80) is preferably 4 times to 10 times the thickness (t) of the raw plate material. This is because, when the width (P) in the circumferential direction is less than 4 times the plate thickness, processing the groove section 80 becomes difficult, and there is a possibility that, due to interfacial tension of water, sufficient drainage will not be obtained. When the width (P) exceeds 10 times the thickness (t), there is a possibility that the strength of the cylindrical section will not be sufficient.

The cross-sectional shape of the groove section 80 illustrated in the figure is semicircular, however, the cross-sectional shape is arbitrary. However, in consideration of achieving both good drainage and ease of processing, it is preferred that the height of the portion through which water passes be 0.5 mm or greater and be equal to or less than the plate thickness (t). Furthermore, the location of the groove section is the same as in the case of the first embodiment. In FIGS. 12A and 12B, in order to more easily understand the construction of the groove section 80, the height of the portion where water passes is represented as being greater than the plate thickness (t).

In the case of the cover 75 of this embodiment, it is not necessary to cut the cylindrical section 77 in order to form the water drainage hole 81, so the possibility of affecting the strength of the cylindrical section 77 is small. Therefore, after the cover 75 has been plastically worked (pressed) into a circular ring shape with a bottom and all of the surfaces have been coated, it is possible to form and process the groove section 80. It is also possible to use material easily rusts as the cover. Furthermore, the shape of the cover 75 is comparatively simple, and there is no problem with the coating adhering as in the case of a complex shape, so after the groove 80 has been formed, coating can be performed easily.

Moreover, in the case of a hub unit bearing 33A that does not have an encoder as in this embodiment, the cover 75 can be formed using inexpensive material such as SPCC steel plate, and by coating the cover 75 it is possible to maintain the water drainage performance and obtain a cover 75 that is rust proof. Preferably an electrode position coating or baking coating is used as the coating. Also, instead of a coating, it is possible to perform a plating process such as electroless nickel plating, chrome plating, galvanization, tin plating or the like, or a combination of these.

As was explained above, in the case of the hub unit bearing 33A of this embodiment, a tunnel shaped water drainage hole 81 is formed between a groove section 80 that is formed in the cylindrical section 77 of the cover 75 such that it is recessed toward the inside in the radial direction and the outer ring member 34A. Therefore, the water drainage hole 81 can be formed in the cylindrical section 77 without cutting. As a result, it is possible to maintain the strength of the cylindrical section 77 and maintain a strong fit of the cover 75 with the outer ring member 34A.

When the cover 75 is viewed from underneath the vehicle (underneath in the radial direction), the inside of the cover 75 is not exposed through the water drainage hole 81 (the inside is covered by the portion of the groove section 80 and the outer ring member 34, so it is possible to effectively prevent foreign matter such as water from entering inside the cover 75.

Furthermore, there are no cuts in the cover 75, so rust proofing such as coating the cover 75 can be performed easily, and thus it possible to improve the antirust capability of the cover 75.

The other construction and function are the same as in the first embodiment described above.

[Embodiment 2, Variation]

FIG. 13 illustrates a variation of the second embodiment. It is also possible to uses a cover 75A as illustrated in FIG. 13 as the cover that covers the inside end sections in the axial direction of the outer ring member 34A and the hub 35A (see FIG. 11). In this cover 75A, a groove section 80A is formed in the cylindrical section 77 such that it is inclined at a specified angle ($\alpha$) with respect to the axis line of the cover 75A.

When the groove section 80A is inclined with respect to the axis line of the cover 75A in this way, by inclining the groove section 80A in the same direction as the direction of rotation of the hub unit bearing 33A, it is possible to easily drain water by the slinger 59 of the seal 37B and the rotation of the encoder 60 that is fastened to the slinger 59, and thus it is possible to improve the water draining capability.

[Embodiment 3]

Next, a third embodiment of the hub unit bearing of the present invention will be explained with reference to FIG. 14. The same reference numbers will be used for parts that are the same or equivalent to those in the first embodiment, and an explanation of those parts will be omitted or simplified.

In the hub unit bearing 33B of this embodiment, a cover 82 as illustrated in FIG. 14 is used. This cover 82 has a large-diameter cylindrical section 83 that fits around the outer circumferential surface 68 of the outer ring member 34, a side wall section 84 that extends from the inside end section in the axial direction of the large-diameter cylindrical section 83 and comes in contact with the surface on the inside end of the outer ring member 34, a small-diameter cylindrical section 85 that extends toward the inside in the axial direction from the inner edge section of the side wall section 84, a disk section 86 that extends toward the inside in the radial direction from the inside end section in the axial direction of the small-diameter cylindrical section 85, and an inner-diameter cylindrical section 87 that extends toward the outside in the axial direction from the inner edge section of the disk section 86. In this cover 82 there is a cut and raised section 71 that is formed in the small-diameter cylindrical section 85 such that it is raised toward the inside in the radial direction.

In this embodiment, a seal 89 is provided between the small-diameter outer circumferential surface 88 that is formed around the inside end section in the axial direction of the inner ring 45 and the inner circumferential surface of the inner-diameter cylindrical section 87 of the cover 82. This seal 89 comprises a metal core 90 having an L-shaped cross section that is pressure fitted around the small-diameter outer circumferential surface 88 of the inner ring 45, and an elastic seal section 92 that is attached to the metal core 90 and has a seal lip 91 that comes in sliding contact with the inner circumferential surface of the inner-diameter cylindrical section 87. This seal 89 prevents various kinds of foreign matter from entering inside the cover 82. The seal lips 91 is not limited to contact type that come in contact with the inner-diameter cylindrical section 87 as described above, and a non-contact type that forms a small space (labyrinth seal) between the seal lip and the inner-diameter cylindrical section 87 could be used.

In the case of this embodiment having the construction described above, the seal 89 that is provided between the cover 82 and the inner ring 45 can effectively prevent foreign matter such as moisture, fine particles and the like from entering inside the cover 82 through the space between the cover 82 and the inner ring 45.

The other construction and function are the same as in the first embodiment described above.

[Embodiment 4]

Next, a fourth embodiment of a hub unit bearing of the present invention will be explained with reference to FIG. 15 to FIG. 20. Features of the hub unit bearing 33C of this embodiment are the construction of the cover 93 that covers the sensing space 22 in the detecting section between the encoder 60 and the sensor 61 from the inside in the axial direction, and the construction of the water drainage hole 94 that is formed in the cover 93. The same reference numbers are given to parts that are the same or equivalent to those of the first embodiment, and explanations of those parts are omitted or simplified.

The cover 93 that is used in this embodiment is made of metal such as non-magnetic stainless steel and comprises a large-diameter cylindrical section 95, a side wall section 96, a small-diameter cylindrical section 97, a disk section 98 and an inner-diameter cylindrical section 99. The large-diameter cylindrical section 95 is fitted onto the inside end section in the axial direction of the outer ring member 34. The side wall section 96 is formed by bending at a right angle toward the inside in the radial direction from the inside end section in the axial direction of the large-diameter cylindrical section 95, and except for part in the circumferential direction (the portion located on the top end when in operation), the outside surface in the axial direction of the side wall section 96 comes in contact with the surface 70 on the inside end in the axial direction of the outer ring member 34. The small-diameter cylindrical section 97 is formed by bending at a right angle toward the inside in the axial direction from the inside end section in the radial direction of the side wall section 96. The disk section 98 is formed by bending at a right angle toward the inside in the radial direction from the inside end section in the axial direction of the small-diameter cylindrical section 97. Furthermore, the inner-diameter cylindrical section 99 is formed by bending at a right angle toward the outside in the axial direction from the inside end section in the radial direction of the disk section 98, and is located on the inside in the radial direction of the small-diameter cylindrical section 97. Moreover, the edge on the tip end (edge on the outside end in the axial direction) of this inner-diameter cylindrical section 99 is located further toward the outside in the axial direction than the inside surface in the axial direction of the side wall section 96, and this edge on the tip end closely faces the edge section on the inner perimeter of the inside surface in the axial direction of the encoder 60, forming a labyrinth seal in that portion. The work of fastening the cover 93 having this kind of construction to the inside end section in the axial direction of the outer ring member 34 is performed by using a jig, the pressure thereof being made of synthetic resin for example, to press the inside surface in the axial direction of the side wall section 96 of the cover 93. In the case of this embodiment, a rust proofing process such as cation electrodeposition coating is performed on the cover 93.

Moreover, the material of the cover 93 can be suitably selected within a range that accomplishes the original objective of covering the inside end section in the axial direction of the outer ring member 34 and hub 35, however, from the aspect of preventing leakage of magnetic flux coming from and entering the inside surface in the axial direction of the encoder 60, which is the detected surface, preferably a non-magnetic material such as non-magnetic stainless steel, aluminum alloy, synthetic resin and the like is used.

Moreover, in this embodiment, there is no bulging section 32 (see FIG. 26 to FIG. 31) formed in the cover 93, and there is a water drainage hole 94 formed in the portion located at the bottom end of the cover 93 in the operating state between the small-diameter cylindrical section 97 and the side wall section 96, and has a size capable of draining foreign matter. Particularly in the case of this embodiment, of this water drainage hole 94, the bottom end section (bottom edge) 101 of the portion that is opened in the side wall section 96 is located in the middle section in the radial direction of the side wall section 96, and is such that it does not reach the outer perimeter edge section of the side wall section 96 (does not pass through in the radial direction). With this kind of construction, a covering section 102 that is formed from the remaining section of the side wall section 96 is provided further on the outside (bottom side during operation) in the radial direction of this side wall section 96 than the opening portion of the water drainage hole 94. Furthermore, in this embodiment, of the water drainage hole 94, the bottom end section 101 that is opened in the side wall section 96 is located further downward than the bottom end section 103 of the inner circumferential surface on the inside end in the axial direction of the outer ring member 34. Moreover in this embodiment, the bottom end section 101 of the water drainage hole 94 is inclined in a direction toward the outside (downward during operation) in the radial direction going away from the surface 70 on the inside end in the axial direction of the outer ring member 34. The shape and size of the water drainage hole 94 is not limited to that illustrated in the drawings and can be appropriately changed within range that allows drainage of foreign matter that has entered inside. Furthermore, the hub unit bearing of the present invention can be changed according to the type of wheel used, the application or according to the region the same way as in the first embodiment described above.

Moreover, in the case of this embodiment, a small-diameter stepped section 104 is formed in the inside end section in the axial direction of the inner ring 45A which forms the hub 35 with the main hub 44. As means for sealing, a seal ring 105 is fitted onto this small-diameter stepped section so as to come in contact with the stepped surface 106 that exists on the outside end section in the axial direction of this small-diameter stepped section 104. The seal ring 105 comprises an L-shaped metal core 107 and a seal member 108 made of an elastic material that is attached and fastened to the outer surface of the metal core 107. The seal member 108 comprises one or a plurality of seal lips 109 (there is one in the example in the figure), and the edge on the tip end of this seal lip 109 comes in sliding contact all the way around a seal surface 110, which is the inner circumferential surface of the inner-diameter cylindrical section 99 of the cover 93. The work of fitting and fastening the seal ring 105 having this kind of construction around the outside of the small-diameter stepped section 104 of the inner ring 45A can be performed after fastening the cover 93 to the inside end section in the axial direction of the outer ring member 34. The drawings illustrate the shape of the edge on the tip end of the seal lip 109 in the free state. In this embodiment, this kind of seal ring 105 is used to close off the sensing space 22 where the encoder 60 and detecting section of the sensor 61 are located from the outside space.

Moreover, a combined seal ring 112 is provided between a shoulder section 111, which exists in the portion between the inner raceway 51b on the inside in the axial direction that is formed around the inner ring 45A and the small-diameter stepped section 104, and the inner circumferential surface of the inside end section in the axial direction of the outer ring member 34. A permanent magnet type encoder 60 is attached and fastened to the inside surface in the axial direction of a slinger 113 of this combined seal ring 112, with the characteristics of the inside surface in the axial direction of this encoder 60, which is the detected surface, alternately changing at uniform intervals in the circumferential direction.

In this embodiment, an active sensor 61, having a magnetic detecting element such as a Hall element or magnetic resistance element in the detecting section, is supported by and fastened to the cover 93 having the construction described above. In this embodiment, the sensor 61 is fitted inside a support section 114 that is formed by causing the portion of the side wall section 96 of the cover 93 that is located on the top end during operation to bulge inward in the axial direction. The detection section of this sensor 61 faces the detected surface of the encoder 60, which is the inside surface in the axial direction. The method for fastening the sensor 61 in the cover 93 is not particularly specified, however, various fastening methods can be employed such as a molded formation, pressure fitting, adhesive fastening using an adhesive, set screw fastening or the like. In the example illustrated in the drawings, the base end section of a harness 115 is connected to the sensor 61, and this harness is drawn out in the diameter direction such that electric power can be supplied to the sensor 61 and detection signals from the sensor 61 can be retrieved. Moreover, a connector 116 for connecting another harness or control device is provided on the tip end section of this harness 115. However, it is also possible to omit this kind of harness 115 and to fasten the connector 116 directly to the sensor 61, or it is also possible to draw this harness 115 inward in the axial direction.

With the hub unit bearing 33C of this embodiment that is constructed as described above, it is possible to suppress foreign matter such as muddy water from entering inside the sensing space 22 where the encoder 60 and the detecting section of the sensor 61 are located through the water drainage hole 94 that is formed in the cover 93, and it is also possible to efficiently drain any foreign matter to the outside space.

In other words, in the case of this embodiment, a water drainage hole 94 is formed in the portion located at the bottom of the cover 93 during operation that is between the small-diameter cylindrical section 97 and the side wall section 96, and the bottom end section (bottom edge) 101 of the portion that is opened in the side wall section 96 is located in the middle section in the radial direction of the side wall section 96. Therefore, there is a cover section 102 that is formed by the remaining portion of the side wall section 96 that is further on the outside (bottom side during operation) in the radial direction that the opening section of the water drainage hole 94. As is clearly illustrated in FIG. 19, even when viewing the cover 93 from below the vehicle, the portion of the water drainage hole 94 that is opened in the side wall section 96 is covered by the cover section 102 and is not exposed. Moreover, when the cover 93 is viewed from the inside in the axial direction, the portion that is opened in the side wall section 96 is covered by the surface 70 on the inside end in the axial direction of the outer ring member 34. Therefore, in this embodiment, it becomes difficult for foreign matter such as muddy water that is splashed during operation of the vehicle to enter inside the sensing space 22 through the portion that is opened in the side wall section 96.

Furthermore, the inner-diameter cylindrical section 99 of the cover 93 is located on the inside in the radial direction of the portion of the water drainage hole 94 that is opened in the small-diameter cylindrical section 97 of the cover 93. Therefore, foreign matter that enters from the portion opened in the small-diameter cylindrical section 97 is thrown by the outer circumferential surface of the inner-diameter cylindrical section 99, or drops down after adhering to the outer circumferential surface of the inner-diameter cylindrical section 99, and is discharged to the outside space. Particularly, the edge on the tip end of the inner-diameter cylindrical section 99 is located further outward in the axial direction than the inside surface in the axial direction of the side wall section 96, so it is possible to sufficiently prevent foreign matter from entering from the portion of the water drainage hole 94 that is opened in the small-diameter cylindrical section 97.

In this way, in this embodiment, it is possible to suppress foreign matter from entering inside the cover 93 through the water drainage hole 94.

Furthermore, in this embodiment, the bottom end section 101 of the portion of the water drainage hole 94 that is opened in the side wall section 96 is located further downward than the bottom end section 103 of the inner circumferential surface of the inside end section in the axial direction of the outer ring member 34. Therefore, it is possible to effectively prevent foreign matter from accumulating between the inner circumferential surface of the inside end in the axial direction of the outer ring member 34 and the outside surface in the axial direction of the side wall section 96, and by taking advantage of the force of gravity, it is possible to efficiently drain foreign matter to the outside space. Moreover, the bottom end section 101 is inclined downward going away from the surface 70 on the inside end in the axial direction of the outer ring member 34, so it is possible to further improve the ability to drain foreign matter to the outside space. In this embodiment, it is not necessary to form a bulging section 32 for forming a water drainage hole in the cover 93 as in the construction of the prior invention described above (see FIGS. 26 to 31), so together with being able to prevent a reduction in freedom of selecting materials for the cover, it is possible to prevent an increase in processing cost. The cover 93 can also be fastened to the outer ring member 34 with sufficient strength. In this embodiment, a labyrinth space is formed between the edge on the tip end of the inner-diameter cylindrical section 99 and the inner perimeter edge of the inside surface in the axial direction of the encoder 60, so it is possible to prevent foreign matter from entering through the water drainage hole 94 and reaching the seal ring 105. Therefore, it is possible to prevent early wear of the edge on the tip end of the seal lip 109 of the seal ring 105. By manufacturing the cover 93 using a non-magnetic material such as non-magnetic stainless steel, and by causing the edge on the tip end of the inner-diameter cylindrical section 99 to closely face the inside surface in the axial direction of the encoder 60, it is possible to maintain the amount of magnetic flux from the encoder 60 reaching the magnetic detecting element of the sensor 61 without magnetic flux leaking to the cover 93. In so doing, it is possible to sufficiently maintain reliability of the rotational speed measurement by the sensor 61.

The other construction and function are the same as those of the first embodiment described above.

[Embodiment 4, Variation 1]

FIG. 21 illustrates a first variation of the fourth embodiment of the present invention. In this variation, a triangular shaped side wall sections 117 are formed on both sides in the circumferential direction of the water drainage hole 94A that is formed in the portion of the cover 93A between the small-diameter cylindrical section 97A and the side wall section 96A. These side wall sections 117 can be formed by pressing at the same time that the water drainage hole 94A is formed. In this variation, with this kind of construction, it is possible to adjust the flow of air, and thus it is possible to improve the effect of preventing water drops from entering inside the sensing space 22 (FIGS. 1 and 2).

[Embodiment 4, Variation 2]

FIG. 22 and FIG. 23 illustrate a second variation of the fourth embodiment of the present invention. In this embodiment, the seal ring 105A as the seal is fitted onto the middle section in the axial direction of the small-diameter stepped section 104A without coming into contact with the step surface 106 that is formed on the outside end section in the axial direction of this small-diameter stepped section 104A. In the case of this embodiment having this kind of construction, the profile irregularity of the portion near the outside end in the axial direction of the step surface 106 and the small-diameter stepped section 104A does not adversely affect the installation precision of the seal ring 105A, so it is not necessary to perform a finishing process (grinding process) on these surfaces. On the other hand, when performing a polishing process using a formed grindstone on the outer surface of the inner ring 45B, the interference between the formed grindstone and the inner ring 45B becomes a problem. Particularly, when grinding both of the shoulder section 111 and the middle section and inside end section in the axial direction of the small-diameter stepped section 104A of the outer circumferential surface of the inner ring 45B at the same time, this problem of interference occurs easily. Therefore, in this embodiment, a relief concave groove 118 is formed all the way around the outside end in the axial direction of the small-diameter stepped section 104A in the portion that is separated outward in the axial direction from the portion where the seal ring 105A fits, and this relief groove 118 sufficiently maintains the amount of caving inward in the radial direction. As a result, in this embodiment, a formed grindstone 119 comprising a diamond wheel such as illustrated in FIG. 23 is used to perform simultaneous grinding of the inner raceway 51b, the shoulder section 111 and the middle section and inside end section in the axial direction of the small-diameter stepped section 104A of the outer circumferential surface of the inner ring 45B at the same time without there being interference between the grindstone 119 and the inner ring 45B.

Moreover, in this embodiment, a seal member 108A comprising two seal lips 109A and 109B are attached and fastened to the outer circumferential surface of the metal core 107 of the seal ring 105A. Both of these seal lips 109A, 109B extend in a direction going away from each other in the axial direction, and the edges on the tip ends come in sliding contact all around the seal surface 110A, which is the inner circumferential surface of the inner-diameter cylindrical section 99A of the cover 93B. Moreover, grease is held between both of these seal lips 109A, 109B.

In this embodiment as well, the cover 93B is made of metal such as non-magnetic stainless steel. The inner-diameter cylindrical section 99A of the cover 93B is a partial cylindrical cone shape that is inclined in a direction such that the outer diameter dimension becomes larger going inward in the axial direction. Furthermore, the edge on the tip end (outside edge in the axial direction) of the inner-diameter cylindrical section 99A is located further outward in the axial direction than the surface on the inside end in the axial direction of the side wall section 96 of the cover 93B, and this edge on tip end closely faces the outer perimeter edge section of the step surface 106 that is formed around the inner ring 45B, forming a labyrinth seal in that portion.

In the case of this embodiment having construction as described above, two seal lips 109A, 109B are provided on the seal ring 105, so when compared with the case of providing only one seal lip, it is possible to further improve the effect of preventing foreign matter such as muddy water from entering inside. Also, there is grease held between both of these seal lips 109A, 109B, so together with being able to prevent an increase in rotation torque of the hub 35 caused by these two seal lips 109A, 109B, it is possible to prevent wear of the edges on the tip ends of the seal lips 109A, 109B.

Moreover, the edge on the tip end of the inner-diameter cylindrical section 99A of the cover 93B is located further outward in the axial direction than the inside surface in the axial direction of the side wall section 96, so it is possible to sufficiently obtain the effect of preventing foreign matter from entering from the portion that is opened in the small-diameter cylindrical section 97 of the water drainage hole 94 that is formed in the bottom end section of the cover 93B. Furthermore, the small-diameter cylindrical section 99A is a partial conical cylinder that is inclined such that the outer diameter dimension becomes larger going inward in the axial direction, so it is possible to efficiently drain foreign matter that has entered inside the sensing space 22 through the water drainage hole 94 to the outside space through the water drainage hole 94. In other words, after foreign matter that has entered through the water drainage hole 94 has adhered to the outer circumferential surface of the inner-diameter cylindrical section 99A, that foreign matter is led along that outer circumferential surface to the outside surface in the axial direction of the disk section 98, and by the force of gravity acting on it, reaches the inner circumferential surface of the small-diameter cylindrical section 97. Therefore, it is possible to efficiently drain foreign matter that has entered into sensing space 22 through the portion that is opened in the small-diameter cylindrical section 97 of the water drainage hole 94. In the case of this variation as well, the bottom end section 101 of the water drainage hole 94 is an inclined surface that is inclined downward going away from the surface 70 on the inside end in the axial direction of the outer ring member 34, so it is possible to even further improve the capability to drain foreign matter to the outside space.

Moreover, in this variation, by making the inner-diameter cylindrical section 99A be a partial conical cylinder, and because the seal surface 110A, which is the inner circumferential surface of the inner-diameter cylindrical section 99A, is tapered, it is possible to effectively prevent the seal ring 105A, which extends outward in the axial direction, from being turned up even when the seal ring 105A is fitted onto the small-diameter stepped section 104B.

Furthermore, in this embodiment, a labyrinth seal is formed between the edge on the tip end of the inner-diameter cylindrical section 99A and the outer perimeter edge of the step surface 106, so it is possible to prevent foreign matter that has entered through the water drainage hole 94 from reaching the seal ring 105A. Therefore, it is possible to prevent early wear of the edges on the tip ends of the seal lips 109A, 109B. Moreover, by manufacturing the cover 93B using a non-magnetic material such as non-magnetic stainless steel, and by causing the edge of the tip end of the inner-diameter cylindrical section 99A to closely face the outer perimeter portion of the step surface 106, it is possible to maintain the amount of magnetic flux from the encoder 30 that reaches the magnetic detection element of the sensor without that magnetic flux leaking to the cover 93B. Therefore, it is possible to sufficiently maintain the reliability of the rotational speed measurement of the sensor.

EXPLANATION OF REFERENCE NUMBERS 1, 1a, 1b Hub unit bearing
2 Outer ring member
3 Inner ring member (hub)

4 Rolling elements (balls)
5 Rotational speed detector
6 Outer raceway
7 Stationary-side flange
8 Main hub
9 Inner ring
10 Inner raceway
11 Rotating-side flange
12 Outer ring for a constant velocity joint
13 Spline hole
14 Seal ring
15 Rolling element installation space
16 Combined seal ring
17, 17a, 17b Cover
18 Seal member
19 Encoder
20 Sensor
21 Slinger
22 Sensing space
23, 23a Water drainage hole
24 Large-diameter cylindrical section
25 Disk section
26 Small-diameter cylindrical section
27 Large-diameter cylindrical section
28 Side wall section
29 Small-diameter cylindrical section
30 Disk section
31 Inner-diameter cylindrical section
32 Bulge section
33, 33a, 33b, 33c Hub unit bearing
34, 34a Outer ring member
35, 35a Inner ring member (hub)
36, 36a Rolling elements (balls)
37a, 37A, 27b, 37B Seal
38 Rotational speed detector
39, 39A, 39B, 39C, 39D Cover
40 Knuckle
41 Retaining hole
42 Stationary-side flange
43 Bolt
44 Main hub
45, 45A, 45B Inner ring
46 Rotating-side flange
47 Hub bolt
48 Spline hole
49 Small-diameter stepped section
50a, 50b Outer raceway
51a, 51b Inner raceway
52 Retainer
53 Rolling element installation space
54 Inner circumferential surface
55 Metal core
56 Elastic seal section
57 Outer circumferential surface
58 Seal lip
59 Slinger
60 Encoder
61 Sensor
62 Detecting section
63 Detected surface
64 Through hole
65 Disk section
66 Small-diameter cylindrical section
67 Large-diameter cylindrical section
68 Outer circumferential surface
69 Stepped section
70 Inside end surface
71, 71C, 71D, 71E Cut and raised section
72, 72C, 72D, 72E Cutting plane line
73 Water drainage hole
74 Sensor hole
75, 75A Cover
76 Disk section
77 Cylindrical section
78 Flange section
79 Inner circumferential surface
80 Groove section
81 Water drainage hole
82 Cover
83 Large-diameter cylindrical section
84 Stepped section
85 Small-diameter cylindrical section
86 Disk section
87 Inner-diameter cylindrical section
88 Small-diameter outer circumferential section
89 Seal
90 Metal core
91 Seal lips
92 Elastic seal section
93, 93A, 93B Cover
94, 94A Water drainage hole
95 Large-diameter cylindrical section
96 Side wall section
97 Small-diameter cylindrical section
98 Disk section
99, 99A Inner-diameter cylindrical section
101 Bottom end section
102 Covering section
103 Bottom end section
104, 104A Small-diameter stepped section
105, 105A Seal ring
106 Step surface
107 Metal core
108, 108A Seal member
109, 109A, 109B Seal lips
110, 110A Seal surface
111 Shoulder section
112 Combined seal ring
113 Slinger
114 Retainer
115 Harness
116 Connector
117 Side wall section
118 Relief concave groove
119 Formed grinding stone
120 Grease

What is claimed is:

1. A hub unit bearing comprising:
an outer ring member having an outer raceway on an inner circumferential surface of the outer ring member;
an inner ring member having an inner raceway on an outer circumferential surface of the inner ring member and a spline hole formed on a center section of the inner ring member;
a plurality of rolling elements provided on the outer raceway and the inner raceway;
an encoder supported at a portion near an inside end section of the inner ring member in an axial direction of the hub unit bearing;
a cover made of metal formed into a circular ring shape and fastened around a portion of an inside end section of the outer ring member in the axial direction;
a sensor supported by the cover;

a seal ring fastened on a small-diameter stepped section that is formed around the inside end section of the inner ring member in the axial direction and closing off a sensing space where the encoder and a detecting section of the sensor are located from an outside space; and a combined seal ring provided between the inside end section of the outer ring member in the axial direction on the inner circumferential surface of the outer ring member and the portion near the inside end section of the inner ring member in the axial direction on the outer circumferential surface of the inner ring member, to which the encoder is attached and fixed; and wherein the cover comprises:

a large-diameter cylindrical section fitted onto and fastened to the inside end section of the outer ring member in the axial direction;

a side wall section formed by bending inward in a radial direction of the hub unit bearing from an inside end section of the large-diameter cylindrical section in the axial direction, with an outside surface of the side wall section in the axial direction coming in contact with an inside end surface of the outer ring member in the axial direction;

a small-diameter cylindrical section formed by bending away from the outer ring member in the axial direction from an inside end section of the side wall section in the radial direction of the hub unit bearing;

a disk section formed by bending inward in the radial direction of the hub unit bearing from an inside end section of the small-diameter cylindrical section in the axial direction;

an inner-diameter cylindrical section formed by bending toward the outer ring member in the axial direction from an inside end section of the disk section in the radial direction of the hub unit bearing and having an inner circumferential surface with which a tip end edge of a seal member made of elastic material of the seal ring comes in sliding contact all around in a circumferential direction of the inner-diameter cylindrical section;

a water drainage hole formed in a portion that is located at a bottom of the cover during operation and between the small-diameter cylindrical section and the side wall section so as to drain any foreign matter which enters inside the sensing space to the outside space, a bottom end section of a portion of the water drainage hole that is opened in the side wall section being located in a middle section of the side wall section in the radial direction of the hub unit bearing and located further downward than a bottom end section of the inner circumferential surface of the inside end section of the outer ring member in the axial direction; and a cover section formed further on an outside of the side wall section in the radial direction of the hub unit bearing than the portion of the water drainage hole that is opened in the side wall section.

2. The hub unit bearing described in claim 1, wherein the inner-diameter cylindrical section has a partial conical cylinder shape that is inclined such that an outer diameter dimension becomes larger going inward in the axial direction.

* * * * *